(12) United States Patent
Dial, Jr. et al.

(10) Patent No.: US 6,735,348 B2
(45) Date of Patent: May 11, 2004

(54) APPARATUSES AND METHODS FOR MAPPING IMAGE COORDINATES TO GROUND COORDINATES

(75) Inventors: Oliver Eugene Dial, Jr., Westminster, CO (US); Jacek Franciszek Grodecki, Brighton, CO (US)

(73) Assignee: Space Imaging, LLC, Thornton, CO (US)

(*) Notice: Subject to any disclaimer, the term of this patent is extended or adjusted under 35 U.S.C. 154(b) by 584 days.

(21) Appl. No.: 09/846,621

(22) Filed: May 1, 2001

(65) Prior Publication Data

US 2003/0044085 A1  Mar. 6, 2003

(51) Int. Cl.[7] ................................................. G06K 9/32
(52) U.S. Cl. ....................................... 382/293; 382/154
(58) Field of Search ................................ 382/293, 276, 382/294, 295, 285, 284, 154, 108, 109; 345/427, 419; 348/42, 46, 47, 48

(56) References Cited

U.S. PATENT DOCUMENTS

| | | | | |
|---|---|---|---|---|
| 4,807,158 A | * | 2/1989 | Blanton et al. ............. 345/581 |
| 4,951,136 A | * | 8/1990 | Drescher et al. ............ 348/145 |
| 5,550,937 A | * | 8/1996 | Bell et al. .................... 382/293 |
| 6,442,293 B1 | * | 8/2002 | Ito et al. ...................... 382/154 |
| 6,661,931 B1 | * | 12/2003 | Kawada ....................... 382/276 |

* cited by examiner

Primary Examiner—Yon J. Couso
(74) Attorney, Agent, or Firm—Holland & Hart

(57) ABSTRACT

A method for photogrammetric block adjustment of satellite imagery using a simplified adjustment model in-lieu of a physical camera model. A known relationship between image space line and sample coordinate and object space X, Y, Z coordinates is provided by a mathematical model. Observations comprise ground control points, tie points, or other observations for which approximate knowledge of object and image space coordinates is available. The photogrammetric block adjustment determines the parameters of the adjustment model to best fit the observations and measurements. Object coordinates can be calculated for features measured in the images after block adjustment. In one embodiment the method is utilized for photogrammetric block adjustment of satellite imagery described by a rational polynomial (RPC) camera model rather than by a physical camera model.

84 Claims, 6 Drawing Sheets i, j, k, l, m, n, ARE IMAGE POSITIONS OF TIE POINTS
I, J, K, L, M, N ARE GROUND POSITIONS OF TIE POINTS
u, v ARE IMAGE POSITIONS OF GROUND CONTROL POINTS
U, V ARE GROUND POSITIONS OF GROUND CONTROL POINTS i, j, k, l, m, n, ARE IMAGE POSITIONS OF TIE POINTS
I, J, K, L, M, N ARE GROUND POSITIONS OF TIE POINTS
u, v ARE IMAGE POSITIONS OF GROUND CONTROL POINTS
U, V ARE GROUND POSITIONS OF GROUND CONTROL POINTS

APPARATUSES AND METHODS FOR MAPPING IMAGE COORDINATES TO GROUND COORDINATES

FIELD OF THE INVENTION

The present invention relates to photogrammetric block adjustments and more particularly to mapping image coordinates from a photographic picture or image to ground coordinates using a Rational Polynomial Camera block adjustment.

BACKGROUND OF THE INVENTION

Topographical maps, orthophoto maps, Digital Elevation Models, and many other metric products are generated from satellite and aerial images. In order to satisfy accuracy requirements for these metric products, a need exists for an accurate mathematical sensor model relating an image coordinate space to an object coordinate space. As shown in FIG. 1, an image coordinate space 110 is a 2-dimensional coordinate system defined only with respect to the image. An object coordinate space 120, however, is a 3-dimensional coordinate system defined with respect to an object being imaged (the imaged object is not shown in FIG. 1) on the ground 130. As will be explained further below, mathematical sensor models allow one to determine the object coordinates in object coordinate space 120 of the object being imaged from the image coordinates in image coordinate space 110. However, these mathematical sensor models are complex. Therefore, it would be desirous to develop a simplified model.

SUMMARY OF THE INVENTION

The foregoing and other features, utilities and advantages of the invention will be apparent from the following more particular description of a preferred embodiment of the invention as illustrated in the accompanying drawings. It is an object of the present invention to describe a simplified method and apparatuses for photogrammetric block adjustment. The present invention uses simple offsets, scale factors, and polynomial adjustment terms in either image or object space to achieve effects analogous within a high degree of accuracy to the effects achieved by adjustment of physical model parameters.

It is a further object of the present invention to have a method of photogrammetric block adjustment that does not present the numerical ill-conditioning problems of classical techniques. The numerical conditioning is achieved by having only one adjustment parameter that represents multiple physical processes that have substantially the same effect.

Another object of the present invention is to simplify development of photogrammetric block adjustment software by utilizing a generic camera model describing object-to-image space relationships and a generic adjustment model for block-adjusting parameters of that relationship. Use of generic models reduces the effort associated with developing individual camera models.

Described is an algorithm for photogrammetric block adjustment of satellite images. The object-to-image relationship of each image in the block of images is described by a rational polynomial camera (RPC) mathematical model. To the basic object-image model of each image, an adjustment model is added. The adjustment model comprises simple offsets, scale-factors, and/or polynomial adjustment terms in either object or image space.

BRIEF DESCRIPTION OF THE DRAWING

The accompanying drawings, which are incorporated in and constitute a part of this specification, illustrate embodiments of the present invention, and together with the description, serve to explain the principles thereof. Like items in the drawings are referred to using the same numerical reference.

DETAILED DESCRIPTION

Figure 1:
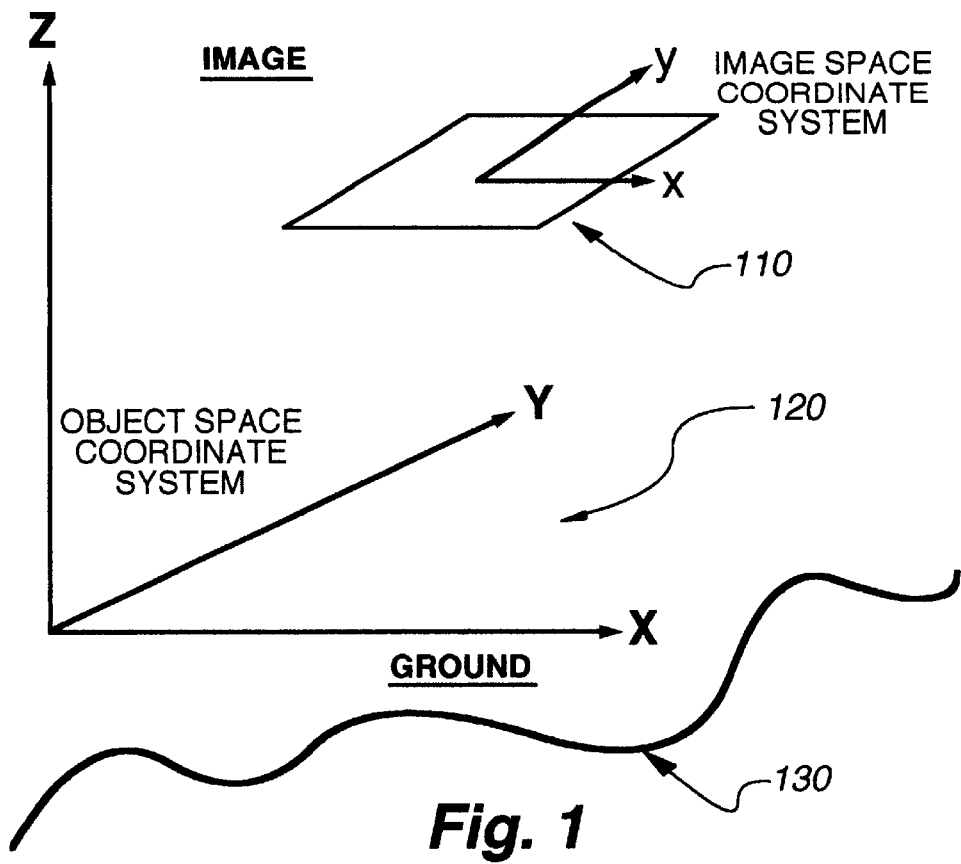
FIG. 1 is a plan view of an image space coordinate system and an object space coordinate system.

As shown in FIG. 1, the image space 110 is a 2-dimensional coordinate system defined with respect to the image. The object space 120 is a 3-dimensional coordinate system defined with respect to an object being imaged. As will be explained, conventional mathematical models relating the image space 110 to the object space 120 are complex. The present invention eliminates many of the complexities by using a parametric model, such as, for example, a rational polynomial camera model, instead of the conventional physical camera models.

Image Coordinate Systems

Figure 2:
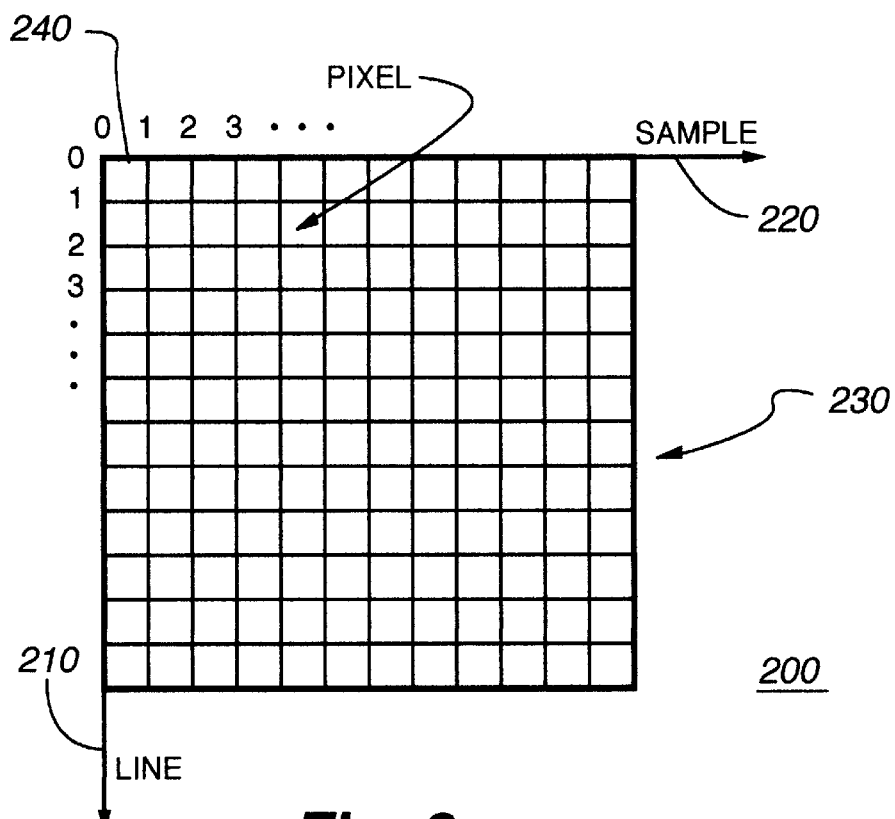
FIG. 2 is a plan view of the image space coordinate system for a digital image.

FIG. 2 shows an image coordinate system 200 for digital images. Image coordinate system 200 has a line axis 210 and a sample axis 220. Image coordinate system 200 comprises a 2-dimensional matrix of a plurality of pixels 230. The upper left corner or the center of the upper left pixel 240 defines the origin of the image coordinate system 200. The line axis 210 points down along the first column of the matrix. The sample axis 220 points right along the first row of the matrix and completes the right-handed coordinate system.

Figure 3:
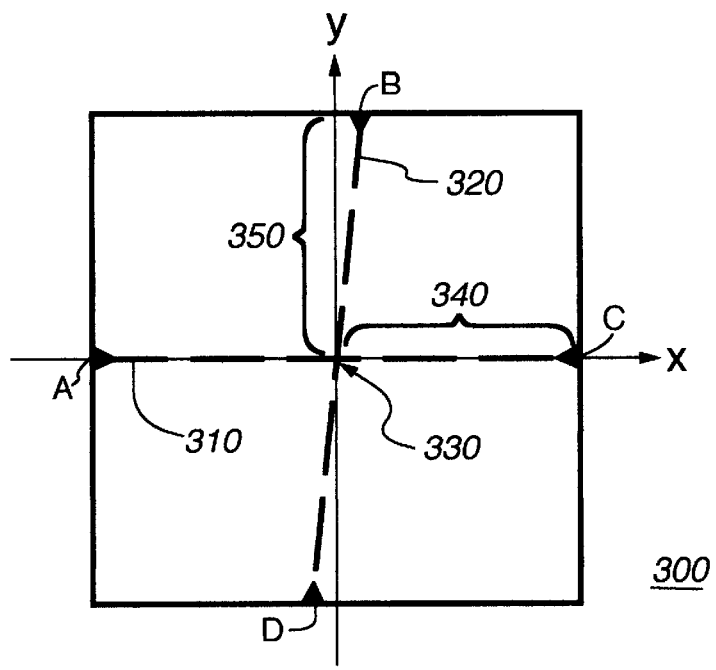
FIG. 3 is a plan view of the image space coordinate system for an analog image.

FIG. 3 shows an image coordinate system 300 for analog (photographic) images. In image coordinate system 300, fiducial marks A, B, C, and D define the image coordinate system. As one of skill in the art would recognize, the fiducial marks A, B, C, and D are typically mounted on the body of the camera and exposed onto the film at the time of imaging. In particular, a line 310 connecting fiducial marks A and C intersects a line 320 connecting fiducial marks B and D at intersection point 330. The intersection point 330 defines the origin of image coordinate system 300. A line 340 extending between the origin at intersection 330 and fiducial mark C define the x-axis (line 340 coincides with line 310). A line 350 extending upwards from intersection 330 at a right angle to the x-axis line 340 defines the y-axis and completes the right-handed coordinate system (line 350 does not necessarily coincide with line 320).

Camera Models

While many different sensor configurations can be used to image objects on the ground, two of the most popular sensor configurations for satellite and aerial imaging systems are the frame camera configuration and the pushbroom camera configuration. Typically, the frame camera configuration is used in aerial imaging systems. Conversely, satellite imaging systems typically use the pushbroom camera configuration.

Frame Camera Model

Figure 4:
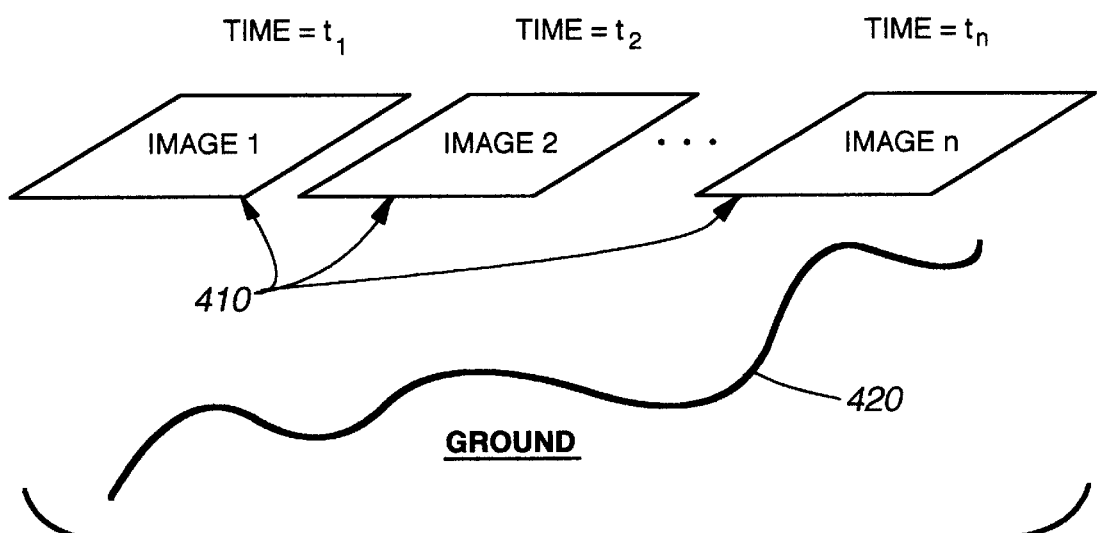
FIG. 4 is a functional view of a frame image camera configuration having images of the ground.

As shown in FIG. 4, the frame camera configuration images, or takes the picture of, an entire image (frame) 410 at one instance of time. Therefore, as the camera moves over the ground, the series of complete images 410 are taken in succession. A mathematical relationship exists that allows the each image 410 to be mapped to the ground 420.

Figure 5:
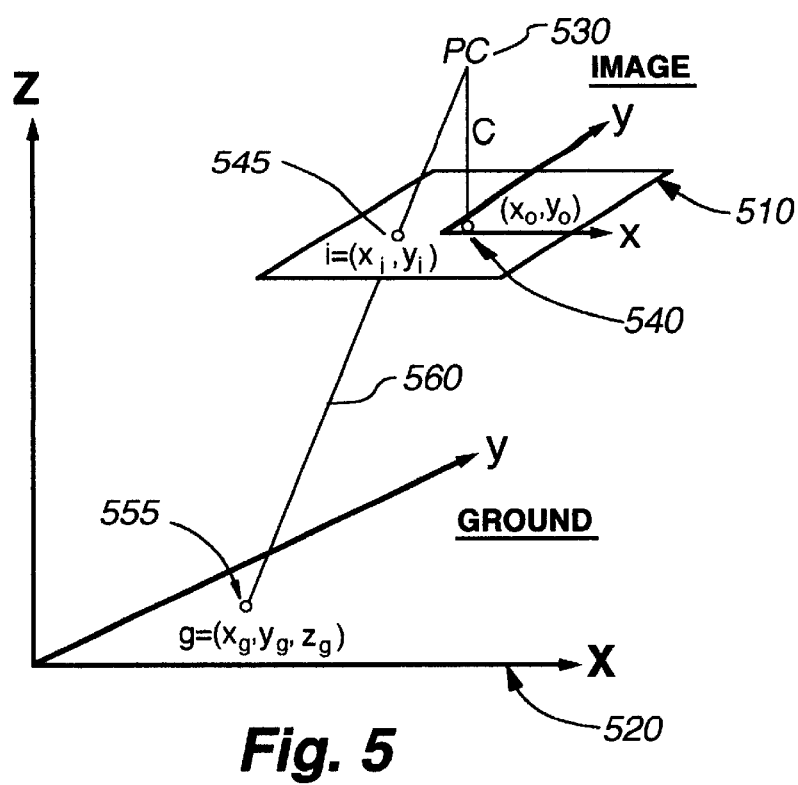
FIG. 5 is a functional diagram of the image space coordinate system to the ground space coordinate system using a perspective projection model for the frame image camera configuration of FIG. 4.

The relationship between the image coordinate system and the object coordinate system is shown in FIG. 5. The relationship shown in FIG. 5 is known as the perspective projection model. In particular, FIG. 5 shows an image space 510 and a ground space 520 (or object space 520 ground space and object space are used interchangeably in this application). The camera taking the image is located at a perspective center ("PC") 530. Directly below the PC 530 in the image space 510 is the principal point 540 having image space coordinates $x_o$ and $y_o$. (As one of skill in the art would know, the image space is actually above the PC, but it is mathematically equivalent to model the system with the PC above the image space.) Image space 510 also has a point i 545 having image space coordinates $x_i$ and $y_i$. The PC 530 has ground space coordinates $X_{pc}$, $Y_{pc}$, and $Z_{pc}$ (not shown in ground space 520). Furthermore, point i 545 corresponds to a point g 555 having ground space coordinates $X_g$, $Y_g$, and $Z_g$. Finally, a line 560 can be drawing that connects PC 530, point i 545, and point g 555.

The mathematical relationship of collinearity defines the line 560. Under the principles of collinearity, the PC 530, the image point i 545, and the corresponding ground point g 555 all lie on the same line. For the frame camera model, the principle of collinearity can be expressed by the following set of equations:

$$F_{x_i} = x_i - x_0 + c\frac{m_{11}(X_g - X_{PC}) + m_{12}(Y_g - Y_{PC}) + m_{13}(Z_g - Z_{PC})}{m_{31}(X_g - X_{PC}) + m_{32}(Y_g - Y_{PC}) + m_{33}(Z_g - Z_{PC})} = 0$$

$$F_{y_i} = y_i - y_0 + c\frac{m_{21}(X_g - X_{PC}) + m_{22}(Y_g - Y_{PC}) + m_{23}(Z_g - Z_{PC})}{m_{31}(X_g - X_{PC}) + m_{32}(Y_g - Y_{PC}) + m_{33}(Z_g - Z_{PC})} = 0$$

where:

$$\begin{bmatrix} m_{11} & m_{12} & m_{13} \\ m_{21} & m_{22} & m_{23} \\ m_{21} & m_{32} & m_{33} \end{bmatrix} = \begin{bmatrix} \cos\phi\cos\kappa & \cos\omega\sin\kappa + \sin\omega\sin\phi\cos\kappa & \sin\omega\sin\kappa - \cos\omega\sin\phi\cos\kappa \\ -\cos\phi\sin\kappa & \cos\omega\cos\kappa - \sin\omega\sin\phi\sin\kappa & \sin\omega\cos\kappa + \cos\omega\sin\phi\sin\kappa \\ \sin\phi & -\sin\omega\cos\phi & \cos\omega\cos\phi \end{bmatrix}$$

(Eq. 1)

is a rotation matrix; and $\omega$, $\phi$ and $\kappa$ are the (pitch, roll, and yaw) attitude angles of the camera;

$X_g$, $Y_g$, $Z_g$ are the object coordinates of point g 555;

$X_{PC}$, $Y_{PC}$, $Z_{PC}$ are the object coordinates of point PC 530;

$x_i$ and $y_i$ are the image coordinates of point i 545;

$x_o$ and $y_o$ are the image coordinates of the principal point 540; and c is the focal length of the camera.

The attitude angles of the camera ($\omega$, $\phi$ and $\kappa$) and the position of the perspective center ($X_{PC}$, $Y_{PC}$, $Z_{PC}$) are the so-called exterior orientation parameters of the frame camera. The interior orientation parameters of the frame camera comprise the focal length (c), the principal point location ($x_0$ and $y_0$), and could optionally include lens distortion coefficients (which are not included in the above equations, but generally known in the art). Other parameters directly related to the physical design and associated mathematical model of the frame camera could also be included as is known in the art.

Pushbroom Camera Configuration

Figure 6:
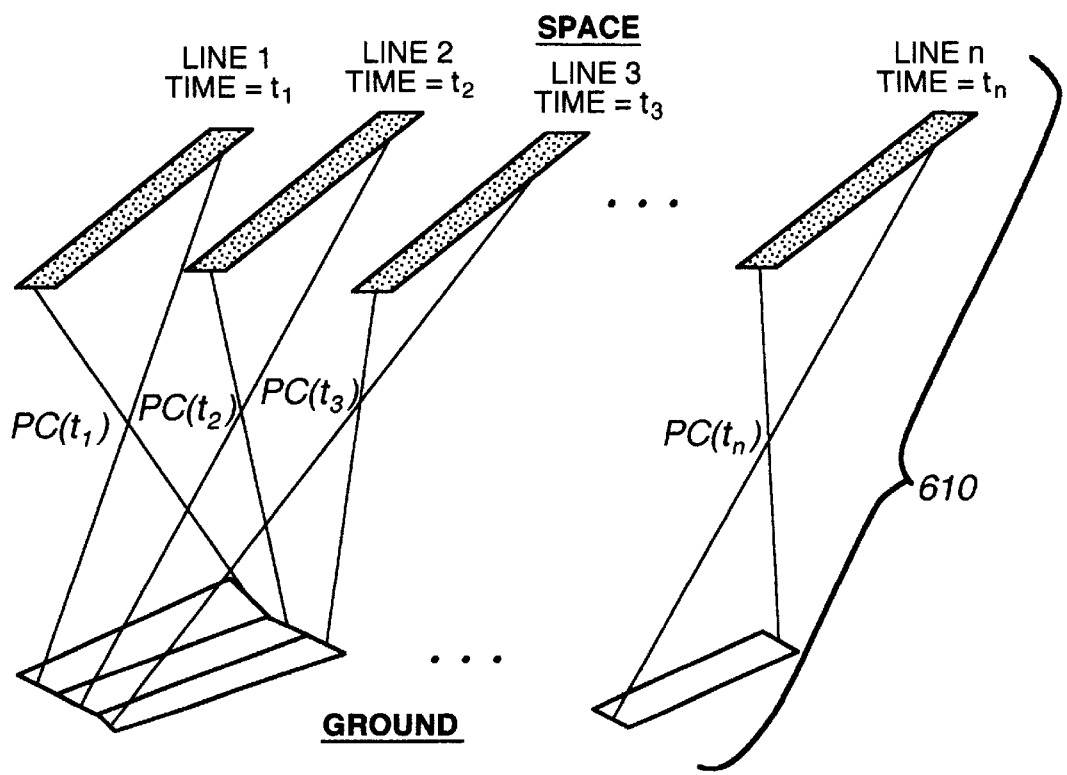
FIG. 6 is a functional diagram of the perspective projection model for the pushbroom image camera configuration.

In the pushbroom camera configuration, a plurality of scan image lines 610 are taken at different instances of time, as shown in FIG. 6. (Notice that FIG. 6 is shown generically without referencing specific points i and g.) A plurality of scan image lines 610 make up a complete image. In other words, a plurality of scan image lines 610 would comprise a single image 410 of the frame camera configuration described above, and each one of the plurality of scan images lines 610 would have its own perspective projection model, which is similar to the model described above for the frame camera configuration. In this model, the ground space to image space relationship for the pushbroom camera configuration can be expressed by a modified collinearity equation in which all exterior orientation parameters are defined as a function of time. The set of modified collinearity equations are:

$$F_{x_i} = -x_0 + c \frac{m(t)_{11}[X_g - X(t)_{PC}] + m(t)_{12}[Y_g - Y(t)_{PC}] + m(t)_{13}[Z_g - Z(t)_{PC}]}{m(t)_{31}[X_g - X(t)_{PC}] + m_{32}[Y_g - Y(t)_{PC}] + m_{33}[Z_g - Z(t)_{PC}]} = 0 \quad \text{(Eq. 2)}$$

$$F_{x_i} = y_i - y_0 + c \frac{m(t)_{21}[X_g - X(t)_{PC}] + m(t)_{22}[Y_g - Y(t)_{PC}] + m(t)_{23}[Z_g - Z(t)_{PC}]}{m(t)_{31}[X_g - X(t)_{PC}] + m(t)_{32}[Y_g - Y(t)_{PC}] + m(t)_{33}[Z_g - Z(t)_{PC}]} = 0$$

$$\begin{bmatrix} m(t)_{11} & m(t)_{12} & m(t)_{13} \\ m(t)_{21} & m(t)_{22} & m(t)_{23} \\ m(t)_{21} & m(t)_{32} & m(t)_{33} \end{bmatrix} = \begin{bmatrix} \cos\phi(t)\cos\kappa(t) & \cos\omega(t)\sin\kappa(t) + \sin\omega(t)\sin\phi(t)\cos\kappa(t) & \sin\omega(t)\sin\kappa(t) - \cos\omega(t)\sin\phi(t)\cos\kappa(t) \\ -\cos\phi(t)\sin\kappa(t) & \cos\omega(t)\cos\kappa(t) - \sin\omega(t)\sin\phi(t)\sin\kappa(t) & \sin\omega(t)\cos\kappa(t) + \cos\omega(t)\sin\phi(t)\sin\kappa(t) \\ \sin\phi(t) & -\sin\omega(t)\cos\phi(t) & \cos\omega(t)\cos\phi(t) \end{bmatrix}$$

is a rotation matrix; and $\omega$, $\phi(t)$ and $\kappa(t)$ are the (pitch, roll, and yaw) attitude angles of the camera;

$X_g$, $Y_g$, $Z_g$ are the object coordinates of a point g located in the ground space imaged;

$X(t)_{PC}$, $Y(t)_{PC}$, $Z(t)_{PC}$ are the object coordinates of the perspective center;

$y_1$ is the sample image coordinate of a point i located in the image space comprising a plurality of scan image lines;

$x_o$ and $y_o$ are the image (sample and line) coordinates of the principal point;

c is the focal length; and t is time.

As one of skill in the art would recognize, the pushbroom camera model exterior orientation parameters are a function of time. In other words, the attitude angles ($\omega(t)$, $\phi(t)$ and $\kappa(t)$) and position of the perspective center ($X(t)_{PC}$, $Y(t)_{PC}$, $Z(t)_{PC}$) change from scan line to scan line. The interior orientation parameters, which comprise focal length (c), principal point location ($x_o$ and $y_o$), and optionally lens distortion coefficients, and other parameters directly related to the physical design and associated mathematical model of the pushbroom camera, are the same for the entire image, which is a plurality of scan image lines 610.

For both camera configurations, however, the exterior orientation parameters may be, and often are, completely unknown. In many instances some or all of these parameters are measured during an imaging event to one level of accuracy or another, but no matter how they are derived, the exterior orientation parameters are not perfectly known. Similarly, the interior orientation parameters, which are typically determined prior to taking an image, also are known to only a limited accuracy. These inaccuracies limit the accuracy with which the object coordinates of the point g 555 can be determined from image coordinates of the corresponding point i 545, for example. Consequently, photogrammetrically derived metric products following only the above equations will have limited accuracy, also.

In order to improve accuracy, multiple overlapping images are customarily block adjusted together. Block adjustment of multiple overlapping images uses statistical estimation techniques, such as least-squares, maximum likelihood and others, to estimate unknown camera model parameters for each image. The images are tied together by tie points whose image coordinates are measured on multiple images, and tied to the ground by ground control points with known or approximately known object space coordinates and measured image positions.

Block Adjusting the Frame Camera Configuration

Figure 7:
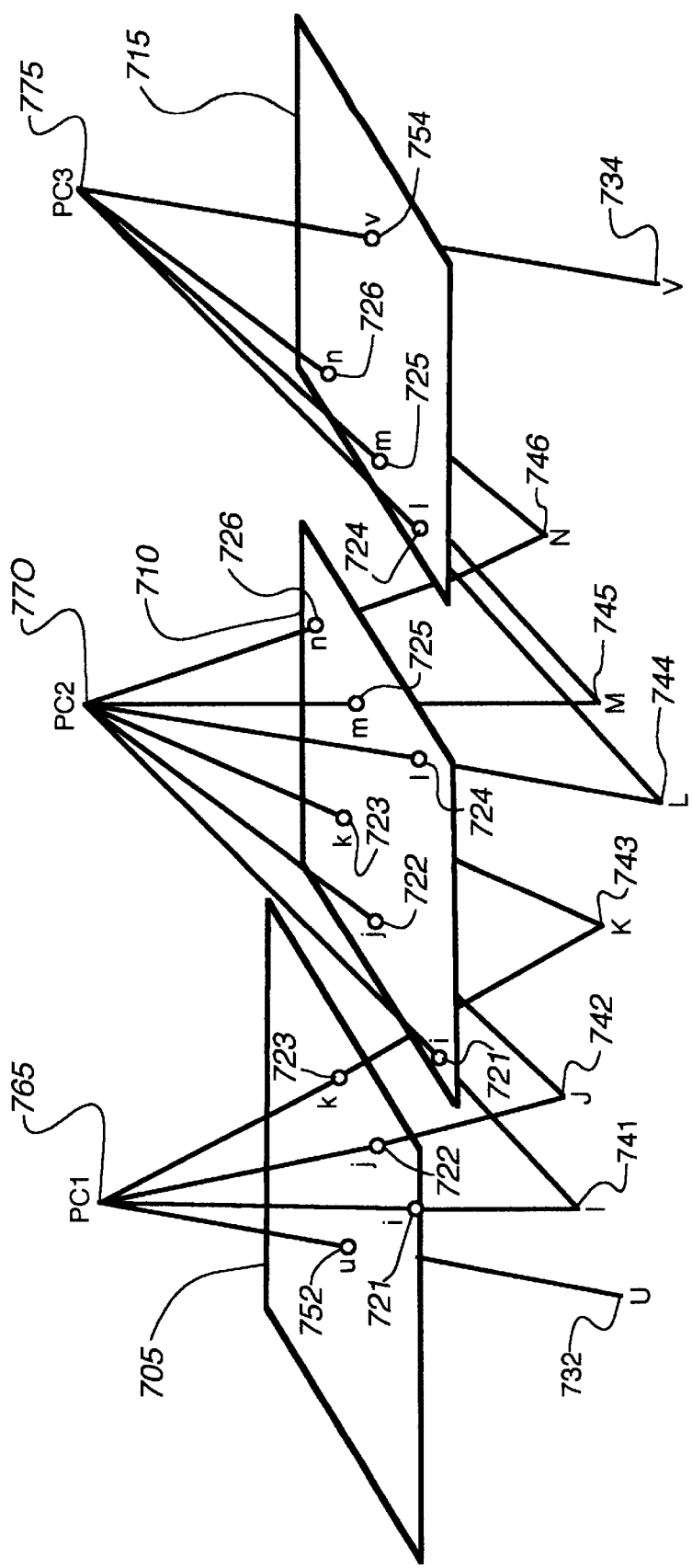
FIG. 7 is a functional diagram demonstrating a block adjustment of images.

In the case of the frame camera model, which is expressed by the first set of collinearity equations (Eq. 1), the unknown model parameters for n overlapping images, with m ground control points and p tie points will be explained with reference to FIG. 7. FIG. 7 shows 3 overlapping images 705, 710, and 715 (i.e., n=3). In the simple case shown in FIG. 7, image 705 has image position tie points 721, 722, and 723; image 710 has image position tie points 721, 722, 723, 724, 725, and 726; and image 715 has image position tie points 724, 725, and 726, which means FIG. 7 has 6 tie points (i.e., p=6). Image 705 is "tied" to image 710 by tie points 721, 722, and 723 and image 710 is "tied" to image 715 by tie points 724, 725, and 726. Furthermore, FIG. 7 has ground control points 732 and 734 (i.e., m=2). Notice that each image position tie point 721–726 has a corresponding ground position 741–746 and ground control points 732 and 734 have a corresponding image positions 752 and 754. Finally, each image 705, 710, and 715 has a PC 765, 770, and 775, respectively, which represents from where the camera took the image. Of course, each image (705, 710, and 715) has six (6) associated exterior orientation parameters (which are attitude angles of the camera ($\omega$, $\phi$ and $\kappa$) and position of the perspective center ($X_{PC}$, $Y_{PC}$, $Z_{PC}$)). Further, each ground control point has three (3) object space coordinates (an X, Y, and Z coordinates). Moreover, each tie point has three (3) corresponding object space coordinates (X, Y, and Z coordinates). In summary, FIG. 7 shows:

(1) The model parameters to be estimated which are:
   6×n exterior orientation parameters (18 parameters);
   3×m object coordinates of ground control points (6 object coordinates of ground control points);
   3×p object coordinates of tie points (18 object coordinates of tie points); and
   optionally (an known in the art, but not represented for simplicity) 3 interior orientation parameters and other parameters directly related to the physical design and associated mathematical model of the camera, as required.

(2) Moreover, the observations used in this model comprise:
   6×n exterior orientation parameters (18 parameters);
   3×m object coordinates of ground control points (6 object coordinates of ground control points);
   2×r (where r≧m) image coordinates of ground control points (4, i.e. 2 times 2 image coordinates of ground control points);
   2×s (where s≧2p) image coordinates of tie points (24 image coordinates of tie points);
   3 interior orientation parameters and other parameters directly related to the physical design and associated mathematical model of the camera, as required.

While generally understood in the art, r is the number of images of the ground control points. For example, FIG. 7 has two ground control points 732 and 734. Point 732 is imaged by Point 752 and Point 734 is imaged by Point 754, thus r is two. However, if ground control point 732 were also imaged in frame 710, then r would equal three (i.e. one more image of a ground control point). Additionally, if Point 732 were also imaged in frame 715, then r would equal four. Similarly understood in the art, s is the number of images of the tie points. For example, FIG. 7 has six tie points 721, 722, 723, 724, 725, and 726. As can be seen in FIG. 7, tie point 721 is imaged in Frame 705 and 710. Similarly, each of the tie points is imaged in two frames, so s is twelve. If tie point 721 were also imaged in frame 715, then s would $\delta_{EO} = [dX_{o1} \, dY_{o1} \, dZ_{o1} \, d\omega_1 \, d\phi_1 \, d\kappa_1 \ldots dX_{on} \, dY_{on} \, dZ_{on} \, d\omega_n \, d\phi_n \, d\kappa_n]^T$ are the unknown corrections to the approximate values of the exterior orientation parameters for n images, $\delta S = [dX_1 \, dY_1 \, dZ_1 \ldots dX_{m+p} \, dY_{m+p} \, dZ_{m+p}]^T$ are the unknown corrections to the approximate values of the object space coordinates for m+p object points, $\delta_{IO} = [dc \, dx_o \, dy_o]^T$ are the unknown corrections to the approximate values of the interior orientation parameters.

$A_{EO}$ is the first order design matrix for the exterior orientation (EO) parameter, $$A_{EO} = \begin{bmatrix} A_{EO_1} \\ A_{EO_2} \\ \vdots \end{bmatrix} \text{ where}$$

$$A_{EO_i} = \frac{\partial F_i}{\partial \beta_{EO}^T}\bigg|_{\beta_o} = \begin{bmatrix} \frac{\partial F_{x_i}}{\partial X_{o_1}} & \frac{\partial F_{x_i}}{\partial Y_{o_1}} & \frac{\partial F_{x_i}}{\partial Z_{o_1}} & \frac{\partial F_{x_i}}{\partial \omega_1} & \frac{\partial F_{x_i}}{\partial \phi_1} & \frac{\partial F_{x_i}}{\partial \kappa_1} & \cdots & \frac{\partial F_{x_i}}{\partial X_{on}} & \frac{\partial F_{x_i}}{\partial Y_{on}} & \frac{\partial F_{x_i}}{\partial Z_{on}} & \frac{\partial F_{x_i}}{\partial \omega_n} & \frac{\partial F_{x_i}}{\partial \phi_n} & \frac{\partial F_{x_i}}{\partial \kappa_n} \\ \frac{\partial F_{y_i}}{\partial X_{o_1}} & \frac{\partial F_{y_i}}{\partial Y_{o_1}} & \frac{\partial F_{y_i}}{\partial Z_{o_1}} & \frac{\partial F_{y_i}}{\partial \omega_1} & \frac{\partial F_{y_i}}{\partial \phi_1} & \frac{\partial F_{y_i}}{\partial \kappa_1} & \cdots & \frac{\partial F_{y_i}}{\partial X_{on}} & \frac{\partial F_{y_i}}{\partial Y_{on}} & \frac{\partial F_{y_i}}{\partial Z_{on}} & \frac{\partial F_{y_i}}{\partial \omega_n} & \frac{\partial F_{y_i}}{\partial \phi_n} & \frac{\partial F_{y_i}}{\partial \kappa_n} \end{bmatrix}\bigg|_{\beta_o}$$

be thirteen. If point 724 were also imaged in frame 705, then s would be fourteen. Because a tie point must be in at least two frames, s must be greater than or equal to twice the number of tie points.

With the above information, application of the Taylor Series expansion to the set of collinearity equations represented as Eq. 1 results in the following linearized math model for the block adjustment with unknown exterior and interior orientation parameters, and object space coordinates of both the ground control and tie points:

$$\begin{bmatrix} A_{EO} & A_S & A_{IO} \\ 0 & I & 0 \\ I & 0 & 0 \\ 0 & 0 & I \end{bmatrix} \begin{bmatrix} \delta_{EO} \\ \delta_S \\ \delta_{IO} \end{bmatrix} + v = \begin{bmatrix} w_P \\ w_S \\ w_{EO} \\ w_{IO} \end{bmatrix} \quad (\text{Eq. 3})$$

or $A\delta + v = w$ with the a priori covariance matrix being:

$$C_w = \begin{bmatrix} C_P & 0 & 0 & 0 \\ 0 & C_S & 0 & 0 \\ 0 & 0 & C_{EO} & 0 \\ 0 & 0 & 0 & C_{IO} \end{bmatrix}$$

The vector of corrections to the approximate values of the model parameters is given as:

$$\begin{bmatrix} \delta_{EO} \\ \delta_S \\ \delta_{IO} \end{bmatrix} = \delta = \beta - \beta_0,$$

$\beta$ is a vector of unknown model parameters and $\beta_o$ is a vector of approximate values of the unknown parameters, typically computed from approximate measurements.

the first order design matrix for the EO parameters—for the i-th image point.

$$A_S = \begin{bmatrix} A_{S_1} \\ A_{S_2} \\ \vdots \end{bmatrix} \text{ where}$$

$$A_{S_i} = \frac{\partial F_i}{\partial \beta_S^T}\bigg|_{\beta_o} = \begin{bmatrix} \frac{\partial F_{x_i}}{\partial X_1} & \frac{\partial F_{x_i}}{\partial Y_1} & \frac{\partial F_{x_i}}{\partial Z_1} & \cdots & \frac{\partial F_{x_i}}{\partial X_{m+p}} & \frac{\partial F_{x_i}}{\partial Y_{m+p}} & \frac{\partial F_{x_i}}{\partial Z_{m+p}} \\ \frac{\partial F_{y_i}}{\partial X_1} & \frac{\partial F_{y_i}}{\partial Y_1} & \frac{\partial F_{y_i}}{\partial Z_1} & \cdots & \frac{\partial F_{y_i}}{\partial X_{m+p}} & \frac{\partial F_{y_i}}{\partial Y_{m+p}} & \frac{\partial F_{y_i}}{\partial Z_{m+p}} \end{bmatrix}\bigg|_{\beta_o}$$

The first order design matrix for the object space coordinates—for the i-th image point.

$A_{IO}$ is the first order design matrix for the interior orientation (IO) parameters where $$A_{IO} = \begin{bmatrix} A_{IO_1} \\ A_{IO_2} \\ \vdots \end{bmatrix} \text{ where}$$

$$A_{IO_i} = \frac{\partial F_i}{\partial \beta_{IO}^T}\bigg|_{\beta_o} = \begin{bmatrix} \frac{\partial F_{x_i}}{\partial c} & \frac{\partial F_{x_i}}{\partial x_o} & \frac{\partial F_{x_i}}{\partial y_o} \\ \frac{\partial F_{y_i}}{\partial c} & \frac{\partial F_{y_i}}{\partial x_o} & \frac{\partial F_{y_i}}{\partial y_o} \end{bmatrix}\bigg|_{\beta_o}$$

is the first order design matrix for the IO parameters—for the i-th image point.

$w_p = F(\beta_o)$ is the vector of misclosures for the image space coordinates.

$w_s = \beta_{S \, observed} - \beta_{S \, o}$ is the vector of misclosures for the object space coordinates.

$w_{EO} = \beta_{EO \, observed} - \beta_{EO \, o}$ is the vector of misclosures for the exterior orientation parameters.

$w_{IO} = \beta_{IO \, observed} - \beta_{IO \, o}$ is the vector of misclosures for the interior orientation parameters.

$C_w$ is the a priori covariance matrix of the vector of observables (misclosures) w.

$C_p$ is the a priori covariance matrix of image coordinates.

$C_S$ is the a priori covariance matrix of the object space coordinates.

$C_{EO}$ is the a priori covariance matrix of the exterior orientation parameters.

$C_{IO}$ is the a priori covariance matrix of interior orientation parameters.

Because the math model is non-linear, the least-squares solution needs to be iterated until convergence is achieved. At each iteration step, application of the least-squares principle results in the following vector of estimated corrections to the approximate values of the model parameters:

$$\hat{\delta} = (A^T C_w^{-1} A)^{-1} A^T C_w^{-1} w \quad \text{(Eq. 4)}$$

At the subsequent iteration step, the vector of approximate values of the unknown parameters $\beta_0$ is replaced by the vector of estimated model parameters as shown by the following:

$$\hat{\beta} = \beta_0 + \hat{\delta},$$

where $\hat{\delta}$ is the vector of corrections estimated in the previous iterative step and the math model is linearized again. The least-squares estimation is repeated until convergence is reached, i.e., when $\hat{\delta}$ is below some predetermined acceptable level. The covariance matrix of the estimated model parameters follows from application of the law of propagation of random errors.

$$C_{\hat{\delta}} = (A^T C_w^{-1} A)^{-1} \quad \text{(Eq. 5)}$$

Block Adjustment of Pushbroom Camera Configuration

Similar to the frame camera adjustment above, a linearized block adjustment model can be implemented for the pushbroom camera model, as expressed by the set of collinearity equations represented by Eq. 2. Generally, the mathematical model described above for the frame camera can be used for pushbroom camera models because a plurality of scan image lines will comprise one frame. In other words, for the pushbroom camera model, the unknown model parameters for n overlapping images, each with j scan lines for each image, together with m ground control points and p tie points (FIG. 7 can be used to represent the Pushbroom model if one assumes each image 705, 710, and 715 comprise a plurality of scan image lines or j image lines in this case) include the following:

6×n×j exterior orientation parameters

3×m object coordinates of ground control points,

3×p object coordinates of tie points,

3×n interior orientation parameters and other time or image dependent parameters directly related to the physical design and associated mathematical model of the pushbroom camera, as required.

Where the observations comprise:

6×n×j exterior orientation parameters

3×m object coordinates of ground control points,

2×r image coordinates of ground control points,

2×s image coordinates of tie points,

3×n interior orientation parameters and other time or image dependent parameters directly related to the physical design and associated mathematical model of the pushbroom camera, as required.

It should be noted that estimation of exterior orientation parameters for each image line is not practical, and it is a standard practice to use a model, such as a polynomial, to represent them in the adjustment model.

Otherwise, the mathematics are similar, and the modifications to the above equations are generally known in the art.

In general, satellite camera models are more complicated than frame camera models because of satellite dynamics and the dynamic nature of scanning, of push-broom, and other time dependent image acquisition systems commonly used for satellite image acquisition. Implementing such a complicated model is expensive, time consuming, and error prone.

As explained above, classical block adjustment models based on physical camera math models, whether pushbroom, frame or other camera configuration, are complicated and difficult to implement. This is, in part, due to the shear volume of interior and exterior parameters that need to be estimated and for which equations need to be solved.

Moreover, a multiplicity of parameters each having the same effect is another difficulty with classical block adjustment techniques using a physical camera model. For example, any combination of moving the exposure station to the right, rolling the camera to the right, or displacing the principal point of the camera to the left all have the same general effect of causing the imagery to be displaced to the left. Classical photogrammetry separately estimates exposure station, orientation, and principal point, leading to ill-conditioning of the solution. Only a priori weights control the adjustment parameters to reasonable values. Ill-conditioning can lead to unrealistic parameter values or even divergence of iteratively solved systems.

A further difficulty with classical techniques is that each camera design, be it a frame camera, pushbroom, or other, presents the software developer with the necessity of developing another adjustment model.

The Rational Polynomial Camera ("RPC") block adjustment method of the present invention avoids all the aforementioned problems associated with the classical photogrammetric block adjustment approach. Instead of adjusting directly the physical camera model parameters, such as satellite ephemeris (position of the perspective center for each scan line), satellite attitude, focal length, principal point location, and distortion parameters, the method introduces an adjustment model that block adjusts images in either image space or object space. In other words, the RPC mathematical model describes the object-to-image relationship of each image in the block of images. To the basic object-image model of each image, an adjustment model is added. The adjustment model comprises simple offsets, scale-factors, and/or polynomial adjustment terms in either object or image space.

The main benefit of the RPC block adjustment model of the present invention is that it does not present the numerical ill-conditioning problems of classical techniques. This is achieved by having only one adjustment parameter to represent multiple physical processes that have substantially the same effect. Furthermore, using such a block adjustment model simplifies development of photogrammetric block adjustment software by using either an existing or a generic camera model describing object-to-image space relationships and a generic adjustment model for block-adjusting parameters of that relationship. Use of generic models reduces the effort associated with developing individual camera models.

While the methods of the present invention can be installed on almost any conventional personal computer, it is preferred that the apparatuses and methods of the present invention use a general purpose computer having at least 512 Mbytes of RAM and 10 gigabytes of storage. Also, it is preferable to use a computer with a stereo display capability. Moreover, one of ordinary skill in the art would understand that the methods, functions, and apparatuses of the present invention could be performed by software, hardware, or any combination thereof.

The RPC Function a tie point image coordinate generation module configured to automatically generate the image coordinates of the at least one tie point and transmit the generated image coordinates of the at least one tie point to the tie point receiving module; and a tie point ground coordinate generation module configured to automatically generate the ground coordinates of the at least one tie point and transmit the generated ground coordinates of the at least one tie point to the tie point receiving module.

The Rational Polynomial Camera ("RPC") model is a generic mathematical model that relates object space coordinates (which comprise Latitude, Longitude, and Height) to image space coordinates (which comprise Line and Sample). The RPC functional model is of the form of a ratio of two cubic functions of object space coordinates. Separate rational functions are used to express the object space coordinates to the image line coordinate and the object space coordinates to the image sample coordinate.

While one of skill in the art will, on reading this disclose, recognize that the RPCs can be applied to numerous types of imaging devices, the description that follows will apply the apparatuses and methods of the present invention to the IKONOS® satellite imaging system by Space Imaging, LLC, which is located at 12076 Grant Street, Thornton, Colo. For the IKONOS® satellite, the RPC model is defined as follows:

Given the object space coordinates (Latitude, Longitude, Height) of a control point, where Latitude is geodetic latitude expressed in degrees in the product order datum, Longitude is geodetic longitude expressed in degrees in the product order datum, and Height is geodetic height expressed in meters height above the ellipsoid of the product order datum, then the calculation of image space coordinates begins by normalizing latitude, longitude, and height as follows, where the normalizing offsets and scale factors are estimated as shown below:

$$P = \frac{\text{Latitude} - \text{LAT\_OFF}}{\text{LAT\_SCALE}} \quad \text{(Eq. 6)}$$

$$L = \frac{\text{Longitude} - \text{LONG\_OFF}}{\text{LONG\_SCALE}} \quad \text{(Eq. 7)}$$

$$H = \frac{\text{Height} - \text{HEIGHT\_OFF}}{\text{HEIGHT\_SCALE}} \quad \text{(Eq. 8)}$$

The normalized image space coordinates (X and Y, which are normalized sample and line image coordinates, respectively) are then calculated from the object space coordinates using their respective rational polynomial functions f(.) and g(.) as $$Y = f(\text{Latitude, Longitude, Height}) = \frac{\text{Num}_L(P, L, H)}{\text{Den}_L(P, L, H)} \quad \text{(Eq. 9)}$$

where $$\text{Num}_L(P, L, H) = a_1 + a_2 \cdot L + a_3 \cdot P + a_4 \cdot H + a_5 \cdot L \cdot P + \quad \text{(Eq. 10)}$$
$$a_6 \cdot L \cdot H + a_7 \cdot P \cdot H + a_8 \cdot L^2 + a_9 \cdot P^2 +$$
$$a_{10} \cdot H^2 + a_{11} P \cdot L \cdot H + a_{12} \cdot L^3 + a_{13} \cdot$$
$$L \cdot P^2 + a_{14} \cdot L \cdot H^2 + a_{15} \cdot L^2 \cdot P + a_{16} \cdot$$
$$P^3 + a_{17} \cdot P \cdot H^2 + a_{18} \cdot L^2 \cdot H + a_{19} \cdot$$
$$P^2 \cdot H + a_{20} \cdot H^3$$

and $$\text{Den}_L(P, L, H) = b_1 + b_2 \cdot L + b_3 \cdot P + b_4 \cdot H + b_5 \cdot L \cdot P + \quad \text{(Eq. 11)}$$
$$b_6 \cdot L \cdot H + b_7 \cdot P \cdot H + b_8 \cdot L^2 + b_9 \cdot P^2 +$$
$$b_{10} \cdot H^2 + b_{11} P \cdot L \cdot H + b_{12} \cdot L^3 + b_{13} \cdot$$
$$L \cdot P^2 + b_{14} \cdot L \cdot H^2 + b_{15} \cdot L^2 \cdot P + b_{16} \cdot$$
$$P^3 + b_{17} \cdot P \cdot H^2 + b_{18} \cdot L^2 \cdot H + b_{19} \cdot$$
$$P^2 \cdot H + b_{20} \cdot H^3$$

and $$X = g(\text{Latitude, Longitude, Height}) = \frac{\text{Num}_S(P, L, H)}{\text{Den}_S(P.L.H)} \quad \text{(Eq. 12)}$$

where $$\text{Num}_S(P, L, H) = c_1 + c_2 \cdot L + c_3 \cdot P + c_4 \cdot H + c_5 \cdot L \cdot P + \quad \text{(Eq. 13)}$$
$$c_6 \cdot L \cdot H + c_7 \cdot P \cdot H + c_8 \cdot L^2 + c_9 \cdot P^2 +$$
$$c_{10} \cdot H^2 + c_{11} P \cdot L \cdot H + c_{12} \cdot L^3 + c_{13} \cdot$$
$$L \cdot P^2 + c_{14} \cdot L \cdot H^2 + c_{15} \cdot L^2 \cdot P + c_{16} \cdot$$
$$P^3 + c_{17} \cdot P \cdot H^2 + c_{18} \cdot L^2 \cdot H + c_{19} \cdot$$
$$P^2 \cdot H + c_{20} \cdot H^3$$

and $$\text{Den}_S(P, L, H) = d_1 + d_2 \cdot L + d_3 \cdot P + d_4 \cdot H + d_5 \cdot L \cdot P + \quad \text{(Eq. 14)}$$
$$d_6 \cdot L \cdot H + d_7 \cdot P \cdot H + d_8 \cdot L^2 + d_9 \cdot P^2 +$$
$$d_{10} \cdot H^2 + d_{11} P \cdot L \cdot H + d_{12} \cdot L^3 + d_{13} \cdot$$
$$L \cdot P^2 + d_{14} \cdot L \cdot H^2 + d_{15} \cdot L^2 \cdot P + d_{16} \cdot$$
$$P^3 + d_{17} \cdot P \cdot H^2 + d_{18} \cdot L^2 \cdot H + d_{19} \cdot$$
$$P^2 \cdot H + d_{20} \cdot H^3$$

The normalized X and Y image space coordinates when de-normalized are the Line and Sample image space coordinates, where Line is image line number expressed in pixels with pixel zero as the center of the first line, and Sample is sample number expressed in pixels with pixel zero is the center of the left-most sample are finally computed as:

$$\text{Line} = Y \cdot \text{LINE\_SCALE} + \text{LINE\_OFF} \quad \text{(Eq. 15)}$$

$$\text{Sample} = X \cdot \text{SAMP\_SCALE} + \text{SAMP\_OFF} \quad \text{(Eq. 16)}$$

RPC Fitting

Figure 8:
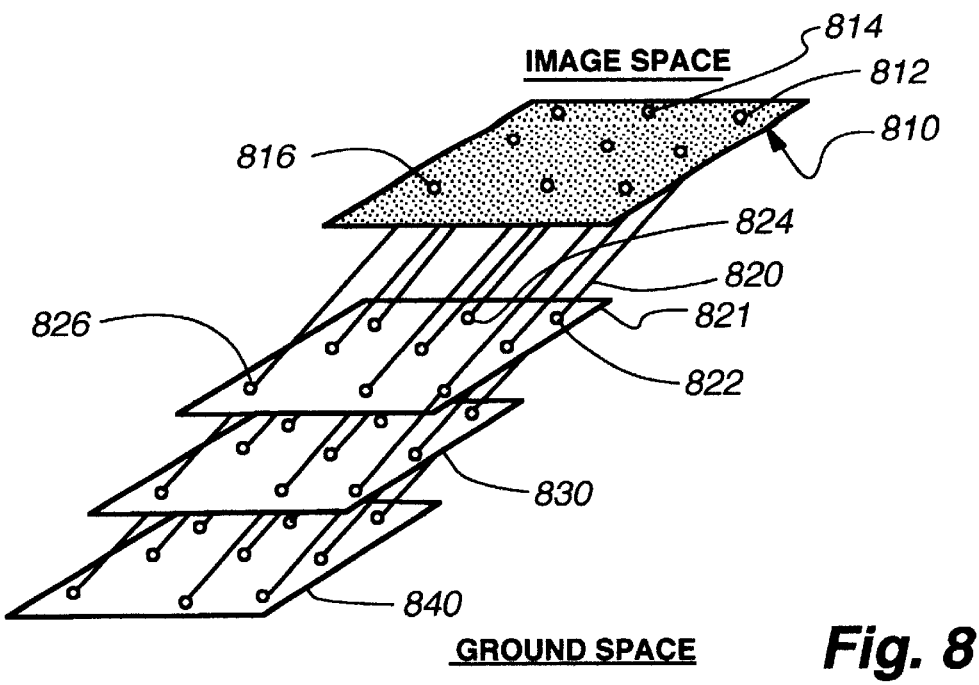
FIG. 8 is a functional diagram showing the principle of RPC generation in accordance with the present invention.

RPC fitting is described in conjunction with FIG. 8. Preferably, a least-squares approach is used to estimate the RPC model coefficients $a_i$, $b_i$, $c_i$, and $d_i$ (where in the above example I=1, 2, ..., 20) from a 3-dimensional grid of points generated using a physical camera model. The 3-dimensional grid of points, composed of object points 822, 824, 826, etc. is generated by intersecting rays 820 with elevation planes 821, 830, and 840. For each point, one ray exists that connects the corresponding points in each elevation plane 821, 830, etc. For example, point 812 in the image space, corresponds to point 822 in elevation plane 821 and ray 820 connects the two points, as well as the corresponding points in other elevation planes, not specifically labeled. The estimation process, which is substantially identical for the f(.) and g(.) rational polynomial functions and is, therefore, explained with respect to the line image coordinate only, is performed independently for each of the image space coordinates.

The offsets are computed as mean values for all grid points as:

$$\text{LINE\_OFF} = \frac{1}{n}\sum_{i=1}^{n} Line_i$$

$$\text{SAMP\_OFF} = \frac{1}{n}\sum_{i=1}^{n} Sample_i$$

$$\text{LAT\_OFF} = \frac{1}{n}\sum_{i=1}^{n} Latitude_i$$

$$\text{LONG\_OFF} = \frac{1}{n}\sum_{i=1}^{n} Longitude_i$$

$$\text{HEIGHT\_OFF} = \frac{1}{n}\sum_{i=1}^{n} Height_i$$

The scale factors are computed as:

$$LINE\_SCALE = \max(|Line_{max} - LINE\_OFF|, |Line_{min} - LINE\_OFF|)$$

$$SAMP\_SCALE = \max(|Sample_{max} - SAMP\_OFF|, |Sample_{min} - SAMP\_OFF|)$$

$$LAT\_SCALE = \max(|Latitude_{max} - LAT\_OFF|, |Latitude_{min} - LAT\_OFF|)$$

$$LONG\_SCALE = \max(|Longitude_{max} - LONG\_OFF|, |Longitude_{min} - LONG\_OFF|)$$

$$HEIGHT\_SCALE = \max(|Height_{max} - HEIGHT\_OFF|, |Height_{min} - HEIGHT\_OFF|)$$

The observation equation for ith observation (grid point) can be written as $$N_i(x_N) - D_i(x_D)y_i = 0 \quad \text{(Eq. 17)}$$

where for the line RPC $$N_i(x_N) = Num_L(P_i, L_i, H_i) \quad \text{(Eq. 18)}$$

$$D_i(x_D) = Den_L(P_i, L_i, H_i) \quad \text{(Eq. 19)}$$

and $$x_N = (a_0, a_1, a_2, a_3, a_4, a_5, a_6, a_7, a_8, a_9, a_{10}, a_{11}, a_{12}, a_{13}, a_{14}, a_{15}, a_{16}, a_{17}, a_{18}, a_{19})^T \quad \text{(Eq. 20)}$$

$$x_D = (b_0, b_1, b_2, b_3, b_4, b_5, b_6, b_7, b_8, b_9, b_{10}, b_{11}, b_{12}, b_{13}, b_{14}, b_{15}, b_{16}, b_{17}, b_{18}, b_{19})^T \quad \text{(Eq. 21)}$$

$y_i$ is the normalized line coordinate (Y) of the ith grid point. For the sample RPC, the terms would be defined as:

$$N_i(x_N) = Num_S(P_i, L_i, H_i) \quad \text{(Eq. 22)}$$

$$D_i(x_D) = Den_S(P_i, L_i, H_i) \quad \text{(Eq. 23)}$$

and $$x_N = (c_0, c_1, c_2, c_3, c_4, c_5, c_6, c_7, c_8, c_9, c_{10}, c_{11}, c_{12}, c_{13}, c_{14}, c_{15}, c_{16}, c_{17}, c_{18}, c_{19})^T \quad \text{(Eq. 22)}$$

$$x_D = (d_0, d_1, d_2, d_3, d_4, d_5, d_6, d_7, d_8, d_9, d_{10}, d_{11}, d_{12}, d_{13}, d_{14}, d_{15}, d_{16}, d_{17}, d_{18}, d_{19})^T \quad \text{(Eq. 23)}$$

$y_i$ is the normalized sample coordinate (X) of the ith grid point, of n grid points.

Then, the first order Taylor series expansion results in $$N_i(x_{N0}) - D_i(x_{D0})y_i + \left[\frac{\partial N_i}{\partial x_N^T}\bigg|_{x_{N0}}\right]dx_N - \left[\frac{\partial D_i}{\partial x_D^T}\bigg|_{x_{D0}}\right]y_i dx_D = 0 \quad \text{(Eq. 24)}$$

with $$A = \begin{bmatrix} A_1 \\ A_2 \\ \vdots \\ A_n \end{bmatrix} \quad \text{(Eq. 25)}$$

being the first order design matrix and where $$A_i = \left[\left[\frac{-\partial N_i}{\partial x_N^T}\bigg|_{x_{N_0}}\right], \left[\frac{\partial D_i}{\partial x_D^T}\bigg|_{x_{D_0}}\right]y_i\right] = [A_{N_i}, A_{D_i}] \quad \text{(Eq. 25)}$$

and $$A_{N_i} = [-1, -L_i, -P_i, -H_i, \ldots, -H_i^3] \quad \text{(Eq. 26)}$$

$$A_{D_i} = [y_i, L_i y_i, P_i y_i, H_i y_i, \ldots, H_i^3 y_i] \quad \text{(Eq. 27)}$$

also with $$dx = \begin{bmatrix} dx_N \\ dx_D \end{bmatrix} \quad \text{(Eq. 28)}$$

being the corrections to the vector of parameters; and with $$B = diag[-D_i(x_{D0})] = diag(B_i) \quad \text{(Eq. 29)}$$

being the second order design matrix and where $$B_i = [-1, -L_i, -P_i, -H_i, \ldots, -H_i^3] \times [1, x_{D1}^0, x_{D2}^0, x_{D3}^0, \ldots, x_{D19}^0]^T \quad \text{(Eq. 30)}$$

and $$y = [y_1, y_2, \ldots, y_n]^T \quad \text{(Eq. 31)}$$

being the vector of image (line or sample) coordinates, and $$w = \begin{bmatrix} N_1(x_{N0}) \\ N_2(x_{N0}) \\ \vdots \\ N_n(x_{N0}) \end{bmatrix} \quad \text{(Eq. 32)}$$

where the least-squares math model is:

$$By + w = Adx + v \text{ with } C_y = \sigma_0^2 I \quad \text{(Eq. 33)}$$

where v is a vector of random unobservable errors.
Then, using the following transformation $$z = By + w \quad \text{(Eq. 34)}$$

one finally gets $$z = Adx + v \text{ with } C_z = BC_y B^T = \sigma_0^2 BB^T \quad \text{(Eq. 35)}$$

The least-squares solution for the correction vector follows with $$d\hat{x} = (A^T C_z^{-1} A)^{-1} A^T C_z^{-1} z \qquad \text{(Eq. 36)}$$

Because the original observation equations are non-linear, the least-squares estimation process outlined above needs to be repeated until convergence is achieved.

RPC Block Adjustment Math Models

One presently preferred embodiment of the present invention uses the RPC model for the object-to-image space relationship and the image space adjustment model. Each image has its own set of RPC coefficients to describe the geometry of that individual image. The image space RPC Block Adjustment model is defined as follows:

$$\text{Line} = \Delta L + f(\text{Latitude}, \text{Longitude}, \text{Height}) + \epsilon_L \qquad \text{(Eq. 37)}$$

$$\text{Sample} = \Delta S + g(\text{Latitude}, \text{Longitude}, \text{Height}) + \epsilon_S \qquad \text{(Eq. 38)}$$

where

Line, Sample are measured line and sample coordinates of a ground control or a tie point with object space coordinates (Latitude, Longitude, Height). The object space coordinates are known to a predetermined accuracy for the ground control points and estimated for the tie points.

$\Delta L$, $\Delta S$ are the adjustment terms expressing the differences between the measured and the nominal line and sample coordinates of a ground control or tie point, which are initially estimated to be zero.

$\epsilon_L$ and $\epsilon_S$ are random unobservable errors, and f and g are the given line and sample RPC models given by Eq. 9 and Eq. 12 (and the associated definitions), respectively.

Furthermore, this preferred embodiment of the present invention uses the image adjustment model defined on the domain of image coordinates with the following terms $$\Delta L = a_o + a_S \cdot \text{Sample} + a_L \cdot \text{Line} \qquad \text{(Eq. 39)}$$

$$\Delta S = b_o + b_S \cdot \text{Sample} + b_L \cdot \text{Line} \qquad \text{(Eq. 40)}$$

where $a_O$, $a_S$, $a_L$, $b_O$, $b_S$, $b_L$ are the unknown adjustment parameters for each image to be estimated, Line and Sample are either measured line and sample coordinates, or nominal line and sample coordinates—given by the RPC function f(.) and g(.) (see Eqs. 6 to 16)—of a ground control or tie point While some error is inevitable, it is preferred for the purpose of implementing the RPC block adjustment model to treat the Line and Sample coordinates (see Eqs. 39 and 40) as fixed and errorless, i.e., there should be no error propagation associated with the first order design matrix. As one of skill in the art of estimation systems will now recognize, extension of this method to include additional polynomial coefficients is straightforward. In the general case, the following model defined on the domain of image space coordinates represents the image space adjustment model:

$$\Delta L = a_0 + a_S \text{Sample} + a_L \text{Line} + a_{SL} \text{Sample Line} + a_{L2} \text{Line}^2 + a_{S2} \text{Sample}^2 + a_{SL2} \text{Sample Line}^2 + a_{S2L} \cdot \text{Sample}^2 \text{Line} + a_{L3} \text{Line}^3 + a_{S3} \cdot \text{Sample}^3 + \qquad \text{(Eq. 41)}$$

and $$\Delta S = b_0 + b_S \text{Sample} + b_L \text{Line} + b_{SL} \text{Sample Line} + b_{L2} \text{Line}^2 + b_{S2} \text{Sample}^2 + b_{SL2} \text{Sample Line}^2 + b_{S2L} \text{Sample}^2 \text{Line} + b_{L3} \cdot \text{Line}^3 + b_{S3} \text{Sample}^3 + \qquad \text{(Eq. 42)}$$

Figure 9:
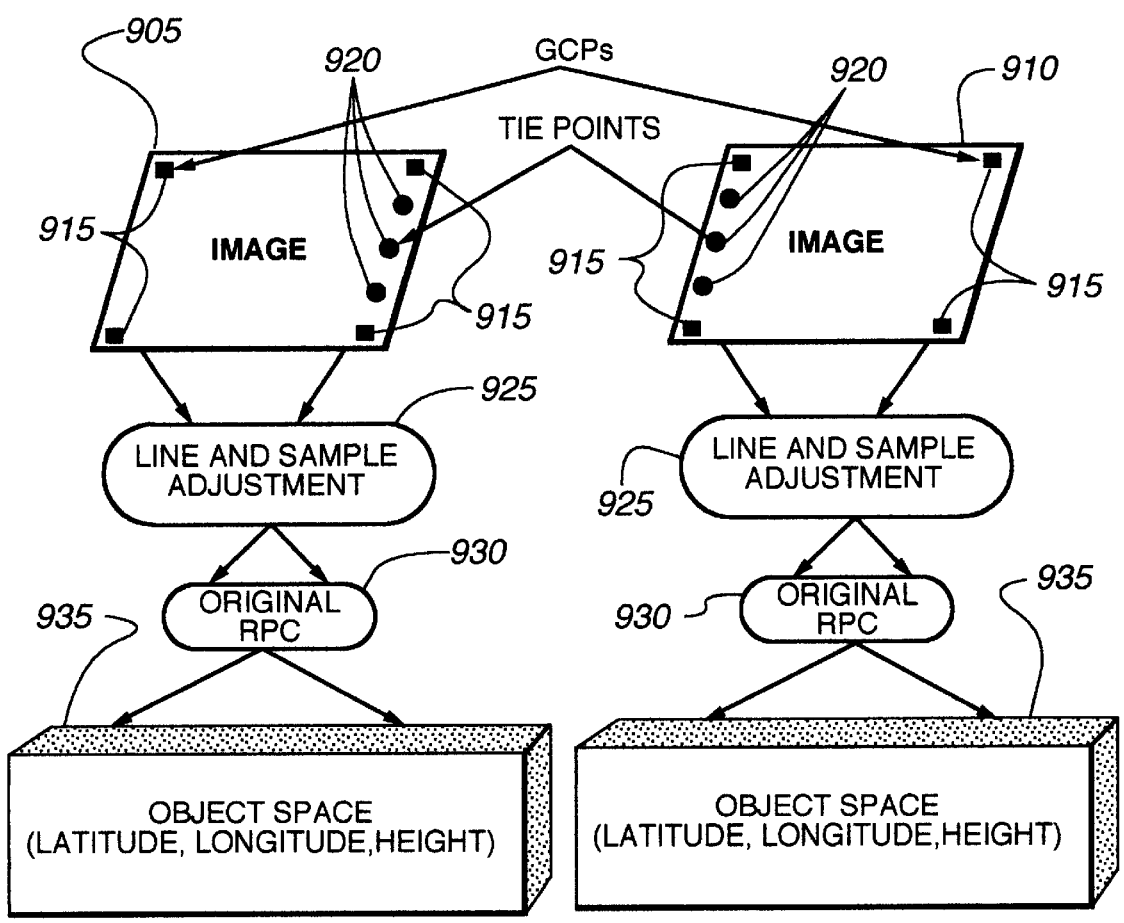
FIG. 9 is a functional diagram showing application of one embodiment of the present invention to block adjust images.

While the methods and apparatus are being explained using a polynomial model, one of skill in the art would recognize that other parametric models could be used, such as orthogonal polynomial, Fourier series, wavelet model. The principle of the preferred embodiments of the proposed RPC Block Adjustment methodology is shown conceptually in the FIG. 9. As can be seen, each image 905 and 910 (be it a single frame or a plurality of scan lines) has a plurality of ground control points 915 and a plurality of tie points 920. These are used as observables to the least-squares adjustment that results in the estimated line and sample adjustment parameters $a_i$ and $b_i$, which define the adjustment terms $\Delta L$ and $\Delta S$ (see Eqs. 41 and 42). Application of the adjustment terms in conjunction with the original RPC equation 930 (Eqs. 6–16) results in the adjusted Line and Sample coordinates.

$$\text{Line} = \Delta L + f(.)$$

$$\text{Sample} = \Delta S + g(.)$$

Alternatively, the image space adjustment model can also be represented a polynomial model defined on the domain of object coordinates as:

$$\Delta L = a_0 + a_P \text{Latitude} + a_L \text{Longitude} + a_H \text{Height} + a_{P2}$$

$$\text{Latitude}^2 + a_{L2} \cdot \text{Longitude}^2 + a_{H2}$$

$$\cdot \text{Height}^2 + a_{PL} \cdot \text{Latitude} \cdot \text{Longitude} + a_{PH} \text{Latitude Height} + a_{LH}$$

$$\cdot \text{Longitude Height} + a_{P3} \cdot \text{Latitude}^3 + a_{L3} \text{Longitude}^3 + a_{H3}$$

$$\text{Height}^3 + . \qquad \text{(Eq. 43)}$$

and $$\Delta S = b_0 + b_P \text{Latitude} + b_L \text{Longitude} + b_H \text{Height} + b_{P2}$$

$$\text{Latitude}^2 + b_{L2} \text{Longitude}^2 + b_{H2} \text{Height}^2 + b_{PL}$$

$$\text{Latitude Longitude} + b_{PH} \text{Latitude Height} + b_{LH} \text{Longitude Height} + b_{P3}$$

$$\text{Latitude}^3 + b_{L3} \text{Longitude}^3 + b_{H3} \text{Height}^3 + \qquad \text{(Eq. 44)}$$

As before, other parametric models can be used.

The adjustment model can also be formulated as the object space adjustment model with:

$$\text{Line} = f(\text{Latitude} + \Delta \text{Latitude}, \text{Longitude} + \Delta \text{Longititde}, \text{Height} + \Delta \text{Height}) + \epsilon_L \qquad \text{(Eq. 45)}$$

and $$\text{Sample} = g(\text{Latitude} + \Delta \text{Latitude}, \text{Longitude} + \Delta \text{Longitude}, \text{Height} + \Delta \text{Height}) + \epsilon_S \qquad \text{(Eq. 46)}$$

where

Line, Sample are measured line and sample coordinates of a ground control or tie point with object space coordinates (Latitude, Longitude, Height). The object space coordinates are known to a predetermined accuracy for the ground control points and estimated for the tie points.

$\Delta$Latitude, $\Delta$Longitude, $\Delta$Height are the adjustment terms expressing the differences between the measured and the nominal object space coordinates of a ground control or tie point, which are initially estimated at zero.

$\epsilon_l$ and $\epsilon_S$ are random unobservable errors, f and g are the given line and sample RPC models given by Eq. 9 and Eq. 12, respectively Using this alternative embodiment, a polynomial model defined on the domain of the object coordinates represents the object space adjustment model as:

$\Delta$Latitude$=a_0+a_P\cdot$Latitude$+a_L\cdot$Longitude$+a_H\cdot$Height$+a_{P2}$ $\cdot$Latitude$^2+a_{L2}\cdot$Longitude$^2+a_{H2}$ $\cdot$Height$^2+a_{PL}\cdot$Latitude Longitude$+a_{PH}$ $\cdot$Latitude Height$+a_{LH}\cdot$Longitude Height$+a_{P3}$ $\cdot$Latitude$^3+a_{L3}\cdot$Longitude$^3+a_{H3}$ $\cdot$Height$^3+$ (Eq. 47)

$\Delta$Longitude$=b_0+b_P\cdot$Latitude$+b_L$ $\cdot$Longitude$+b_H\cdot$Height$+b_{P2}$ $\cdot$Latitude$^2+b_{L2}\cdot$Longitude$^2+b_{H2}$ $\cdot$Height$^2+b_{PL}\cdot$Latitude Longitude$+b_{PH}$ $\cdot$Latitude Height$+b_{LH}\cdot$Longitude Height$+b_{P3}$ $\cdot$Latitude$^3+b_{L3}\cdot$Longitude$^3+b_{H3}$ $\cdot$Height$^3+$ (Eq. 48)

and $\Delta$Height$=c_0+c_P\cdot$Latitude$+c_L$ $\cdot$Longitude$+c_H\cdot$Height$+c_{P2}$ $\cdot$Latitude$^2+c_{L2}\cdot$Longitude$^2+c_{H2}$ $\cdot$Height$^2+c_{PL}\cdot$Latitude Longitude$+c_{PH}$ $\cdot$Latitude Height$+c_{LH}\cdot$Longitude Height$+c_{P3}$ $\cdot$Latitude$^3+c_{L3}\cdot$Longitude$^3+c_{H3}$ $\cdot$Height$^3+$(Eq. 48)

Once again, other parametric models can be used.

RPC Block Adjustment Algorithm

The RPC adjustment models given above in Eqs. 37–49 allow block adjusting multiple overlapping images. The RPC block adjustment of multiple overlapping images uses statistical estimation techniques, such as least-squares, maximum likelihood and others, to estimate unknown camera model parameters for each image. Restating the above for simplicity, one preferred embodiment of the present invention uses the image space adjustment model $\text{Line}=\Delta L+f(\text{Latitude,Longitude,Height})+\epsilon_L$ (Eq. 50)

$\text{Sample}=\Delta S+g(\text{Latitude,Longitude,Height})+\epsilon_S$ (Eq. 51)

where the adjustment terms ($a_O$, $a_S$, $a_L$, $b_O$, $b_S$, $b_L$) are defined on the domain of image coordinates as:

$\Delta L=a_o+a_S\cdot$Sample$+a_L\cdot$Line (Eq. 52)

$\Delta S=b_o+b_S\cdot$Sample$+b_L\cdot$Line (Eq. 53)

or, if more degrees of freedom are required (in the presently preferred embodiment, sufficient accuracy is achieved using a first order equation), as:

$\Delta L=a_0+a_S$Sample$+a_L$Line$+a_{SL}$Sample Line$+a_{L2}$Line$^2+a_{S2}$Sample$^2+a_{SL2}$Sample Line$^2+a_{S2L}$Sample$^2$Line$+a_{L3}$Line$^3+a_{S3}$Sample$^3+$ (Eq. 54)

and $\Delta S=b_0+b_S$Sample$+b_L\cdot$Line$+b_{SL}\cdot$Sample Line$+b_{L2}\cdot$Line$^2+b_{S2}$Sample$^2+b_{SL2}$Sample Line$^2+b_{S2L}$Sample$^2$Line$+b_{L3}$Line$^3+b_{S3}$Sample$^3+$ (Eq. 55)

Referring back to FIG. 9, the overlapping images 905 and 910 are tied together by tie points 920 whose image space coordinates are measured on those images 905 and 910, and tied to the ground by ground control points 915 with known or approximately known object space coordinates and measured image positions. Thus, incorporating this information generically into the equations, then for the i-th image point on the j-th image, the image space adjustment model reads:

$\text{Line}_i^{(j)}=\Delta L_i^{(j)}+f^{(j)}(\text{Latitude}_i,\text{Longitude}_i,\text{Height}_i)+\epsilon_L^{(j)}$ (Eq. 56)

and $\text{Sample}_i^{(j)}=\Delta S_i^{(j)}+g^{(j)}(\text{Latitude}_i,\text{Longitude}_i,\text{Height}_i)+\epsilon_S^{(j)}$ (Eq. 57)

with $\Delta L_i^{(j)}=a_0^{(j)}+a_S^{(j)}\cdot\text{Sample}_i^{(j)}+a_L^{(j)}\cdot\text{Line}_i^{(j)}$ (Eq. 58)

and $\Delta S_i^{(j)}=b_0^{(j)}+b_S^{(j)}\cdot\text{Sample}_i^{(j)}+b_L^{(j)}\cdot\text{Line}_i^{(j)}$ (Eq. 59)

As explained above, for the purpose of implementing the RPC block adjustment model of one presently preferred embodiment of the present invention, the $\text{Line}_i^{(j)}$ and $\text{Sample}_i^{(j)}$ coordinates in Eq. 56 and Eq. 57 should be treated as fixed and errorless, i.e., there should be no error propagation associated with the first order design matrix.

When the unknown math model parameters for Eq. 56 and Eq. 57 with the adjustment terms defined by Eq. 58 and Eq. 59 are applied for n overlapping images with m ground control points and p tie points there exist:

6×n adjustment parameters ($X_{AD}$), and

3×m object coordinates of ground control points, and 3×p object coordinates of tie points ($X_S$).

Observations comprise:

6×n a priori values of the adjustment parameters, which are estimate initially to be zero, 3×m object coordinates of ground control points, which are known or approximately known values, 2×r ($r \geq m$) line and sample image coordinates of ground control points, which are measured from the image, and 2×s ($s \geq p$) line and sample image coordinates of tie points, which are measured from the image.

With the above known and measured values application of the Taylor Series expansion to the RPC block adjustment equations 56–59 results in the following linearized model represented by Eq. 60 and 61 below:

$$Line_i^{(j)} = a_0^{(j)} + a_S^{(j)} \cdot Sample_i^{(j)} + a_L^{(j)} \cdot Line_i^{(j)} + \qquad \text{(Eq. 60)}$$
$$f^{(j)}(Latitude_{0i}, Longitude_{0i}, Height_{0i}) +$$
$$\left[\frac{\partial f^{(j)}}{\partial Latitude}\bigg|_{\substack{Latitude_{0i}\\Longitude_{0i}\\Height_{0i}}}\right]dLatitude_i +$$
$$\left[\frac{\partial f^{(j)}}{\partial Longitude}\bigg|_{\substack{Latitude_{0i}\\Longitude_{0i}\\Height_{0i}}}\right]dLongitude_i +$$
$$\left[\frac{\partial f^{(j)}}{\partial Height}\bigg|_{\substack{Latitude_{0i}\\Longitude_{0i}\\Height_{0i}}}\right]dHeight_i + \varepsilon_L^{(j)}$$

and $$Sample_i^{(j)} = b_0^{(j)} + b_S^{(j)} \cdot Sample_i^{(j)} + b_L^{(j)} \cdot Line_i^{(j)} + \qquad \text{(Eq. 61)}$$
$$g^{(j)}(Latitude_{0i}, Longitude_{0i}, Height_{0i}) +$$
$$\left[\frac{\partial g^{(j)}}{\partial Latitude}\bigg|_{\substack{Latitude_{0i}\\Longitude_{0i}\\Height_{0i}}}\right]dLatitude_i +$$
$$\left[\frac{\partial g^{(j)}}{\partial Longitude}\bigg|_{\substack{Latitude_{0i}\\Longitude_{0i}\\Height_{0i}}}\right]dLongitude_i +$$
$$\left[\frac{\partial g^{(j)}}{\partial Height}\bigg|_{\substack{Latitude_{0i}\\Longitude_{0i}\\Height_{0i}}}\right]dHeight_i + \varepsilon_S^{(j)}$$

Furthermore, this block adjustment model in matrix form reads:

$$\begin{bmatrix} A_{AD} & A_S \\ I & 0 \\ 0 & I \end{bmatrix} \begin{bmatrix} x_{AD} \\ dx_S \end{bmatrix} + v = \begin{bmatrix} w_P \\ w_{AD} \\ w_S \end{bmatrix} \qquad \text{(Eq. 62)}$$

or $$Adx + v = w$$

with the a priori covariance matrix of the vector of observables (misclosures) w being:

$$C_n = \begin{bmatrix} C_P & 0 & 0 \\ 0 & C_{AD} & 0 \\ 0 & 0 & C_S \end{bmatrix}$$

where:

dx is a vector of unknown model parameters to be estimated for the purpose of arriving at a solution such that:

$$dx = \begin{bmatrix} x_{AD} \\ dx_S \end{bmatrix} \text{ and}$$

$$x_{AD} = [a_{01} \ a_{S1} \ a_{L1} \ b_{01} \ b_{S1} \ b_{L1} \ \ldots \ a_{0n} \ a_{Sn} \ a_{Ln} \ b_{0n} \ b_{Sn} \ b_{Ln}]^T;$$

which are the RPC adjustment model parameters for n images, and $$dx_S = [dLatitude_1 \ dLongitude_1 \ dHeight_1 \ \ldots \ dLatitude_{m+p} \ dLongitude_{m+p} \ dHeight_{m+p}]^T;$$

which are the corrections to the approximate object space coordinates, $x_{so}$, such that:

$$x_{S0} = [Latitude_{01} \ Longitude_{01} \ Height_{01} \ dLatitude_{0m+p} \ dLongitude_{0m+p} \ dHeight_{0m+p}]^T$$

for the m ground control and the p tie points,

A is the first order design matrix, $$A = \begin{bmatrix} A_{AD} & A_S \\ I & 0 \\ 0 & I \end{bmatrix}$$

where $$A_{AD} = \begin{bmatrix} A_{AD_1} \\ \vdots \\ A_{AD_i} \\ \vdots \end{bmatrix}$$

is the first order design matrix for the adjustment parameters and where $$A_{AD_i} = \begin{bmatrix} 0 & \ldots & 1 & Sample_i^{(j)} & Line_i^{(j)} & 0 & 0 & 0 & 0 & \ldots & 0 \\ 0 & \ldots & 0 & 0 & 0 & 1 & Sample_i^{(j)} & Line_i^{(j)} & 0 & \ldots & 0 \end{bmatrix}$$

is the first order design sub-matrix for the adjustment parameters, that is to say the design sub-matrix for the i-th image point on the j-th image, further $$A_S = \begin{bmatrix} A_{S_1} \\ \vdots \\ A_{S_i} \\ \vdots \end{bmatrix}$$

is the first order design matrix for the object space coordinates and $$A_{S_i} = \begin{bmatrix} 0 & \ldots & \frac{\partial f^{(j)}}{\partial Latitude}\bigg|_{\substack{Latitude_{0k}\\Longitude_{0k}\\Height_{0k}}} & \frac{\partial f^{(j)}}{\partial Longitude}\bigg|_{\substack{Latitude_{0k}\\Longitude_{0k}\\Height_{0k}}} & \frac{\partial f^{(j)}}{\partial Height}\bigg|_{\substack{Latitude_{0k}\\Longitude_{0k}\\Height_{0k}}} & 0 & \ldots & 0 \\ 0 & \ldots & \frac{\partial g^{(j)}}{\partial Latitude}\bigg|_{\substack{Latitude_{0k}\\Longitude_{0k}\\Height_{0k}}} & \frac{\partial g^{(j)}}{\partial Longitude}\bigg|_{\substack{Latitude_{0k}\\Longitude_{0k}\\Height_{0k}}} & \frac{\partial g^{(j)}}{\partial Height}\bigg|_{\substack{Latitude_{0k}\\Longitude_{0k}\\Height_{0k}}} & 0 & \ldots & 0 \end{bmatrix}$$

is the first order design sub-matrix for the object space coordinates of the k-th ground control or tie point—for the i-th image point on the j-th image, and (Latitude$_{Ok}$, Longitude$_{Ok}$, Height$_{Ok}$) are the approximate object space coordinates for point k. Then, $$w_P = \begin{bmatrix} w_{P_1} \\ \vdots \\ w_{P_i} \\ \vdots \end{bmatrix}$$

is the vector of misclosures for the image space coordinates, and $$w_{P_i} = \begin{bmatrix} Line_i^{(j)} - f^{(j)}(Latitude_{0i}, Longitude_{0i}, Height_{0i}) \\ Sample_i^{(j)} - g^{(j)}(Latitude_{0i}, Longitude_{0i}, Height_{0i}) \end{bmatrix}$$

is the sub-vector of misclosures—for the i-th image point on the j-th image, and $$w_{AD} = 0$$

is the vector of misclosures for the adjustment parameters, and $$w_S = \begin{bmatrix} w_{S_1} \\ \vdots \\ w_{S_i} \\ \vdots \end{bmatrix}$$

is the vector of misclosures for the image space coordinates, and $$w_{S_i} = \begin{bmatrix} Latitude_i - Latitude_{0i} \\ Longitude_i - Longitude_{0i} \\ Height_i - Height_{0i} \end{bmatrix}$$

is the sub-vector of misclosures—for the i-th image point, $C_P$ is the a priori covariance matrix of image coordinates,
$C_{AD}$ is the a priori covariance matrix of the adjustment parameters, and
$C_S$ is the a priori covariance matrix of the object space coordinates.

Following the methods described above, the math model in non-linear the least-squares solution needs to be iterated until convergence is achieved. At each iteration step, application of the least-squares principle results in the following vector of estimated corrections to the approximate values of the model parameters:

$$d\hat{x} = (A^T C_w^{-1} A)^{-1} A^T C_w^{-1} w$$

At the subsequent iteration step the vector of approximate values of the object space coordinates $x_{S0}$ is replaced by the estimated values $\hat{x}_S = x_{S0} + d\hat{x}_S$,
where $d\hat{x}$ is the vector of corrections estimated in the previous iterative step and the math model is linearized again. The least-squares estimation is repeated until convergence is reached.

The covariance matrix of the estimated model parameters follows from application of the law of propagation of random errors with:

$$C_{\hat{x}} = (A^T C_w^{-1} A)^{-1}$$

While the preferred embodiment of the method has been described, those familiar with the art to which this invention relates will recognize various alternatives and embodiments for practicing the invention.

Figure 10:
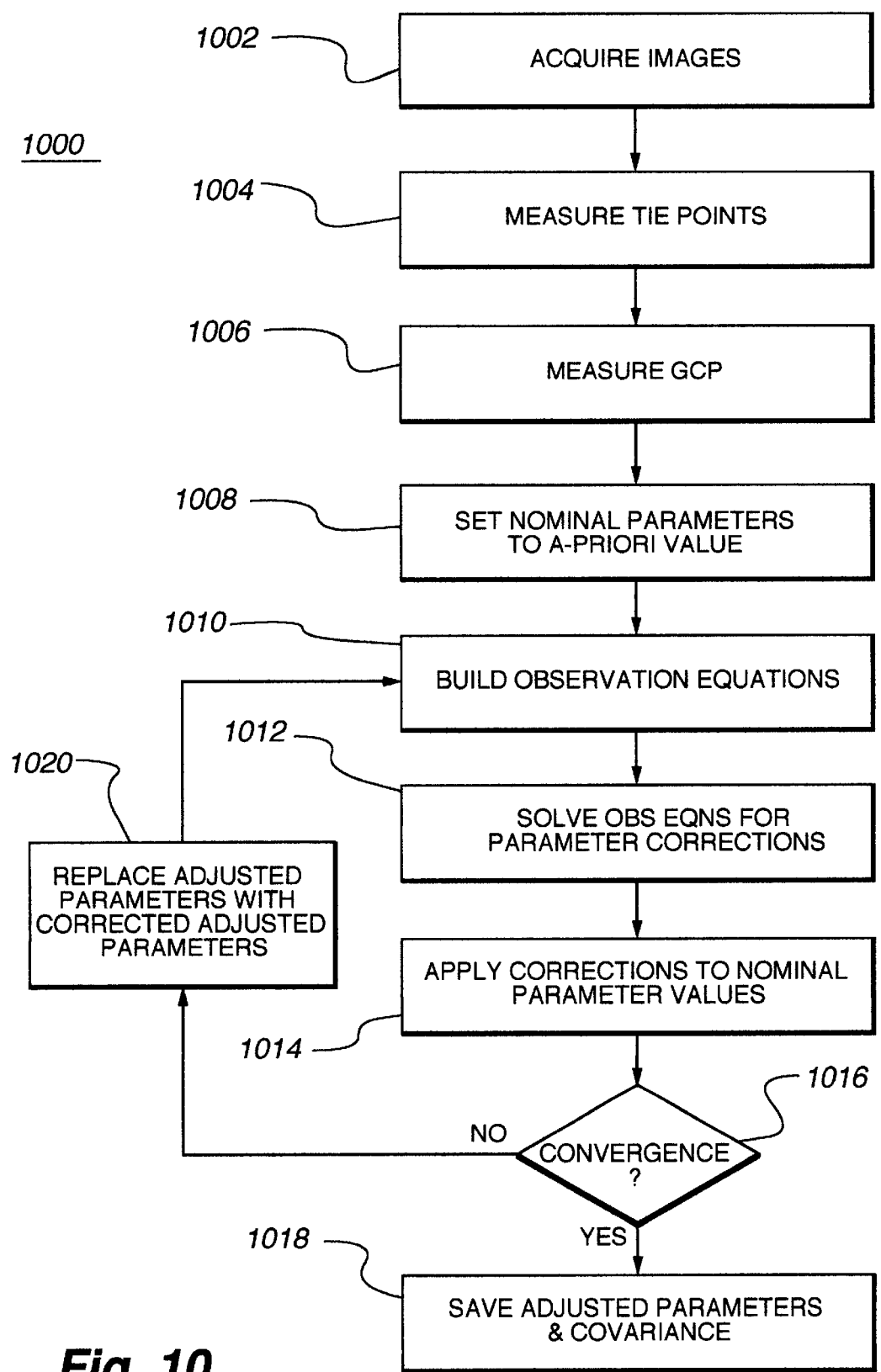
FIG. 10 is a flowchart illustrating a method of performing a block adjustment in accordance with one embodiment of the present invention.

FIG. 10 is a flowchart 1000 illustrating a method of implementing the RPC model of the present invention. First, it is preferred that one or more images are acquired or input into the computer, Step 1002. The images can be directly downloaded from the imaging device or input in another equivalent manner. Once the images are acquired, the tie points between any overlapping images are identified, and the image coordinates of the tie points are measured, Step 1004. Next, any ground control points are identified and both the image and object coordinates of the ground control points are measured, Step 1006. After any tie points and ground control points are determined, a RPC model for each image including adjustment parameters is established to model the nominal relationship between the image space and the ground space, initially, the adjustment parameters are set to predetermined a priori values (preferably zero), Step 1008. Using the adjustment parameters, the observation equations are built, Step 1010, and solved for parameter corrections, Step 1012. The corrections are applied to the adjustment parameters to arrive at corrected adjustment parameters, Step 1014. Next, it is determined whether the corrected adjustment parameters achieve convergence, Step 1016. If convergence is achieved, the corrected adjustment parameters and covariance are same, Step 1018. If convergence is not achieved, the adjustment parameters are replaced by the corrected adjustment parameters, Step 1020, and Steps 1010 to 1016 are repeated.

While the invention has been particularly shown and described with reference to and in terms of the rational polynomial camera model, which is a presently preferred embodiment thereof, it will be understood by those skilled in the art that various other nominal relation between ground and image space with adjustment parameters or other changes in the form and details may be made without departing from the spirit and scope of the invention.

We claim:

1. A method performed on a processor of adjusting at least one image to provide a relationship between a ground coordinate space and an image coordinate space, the method comprising the steps of:
   obtaining an image having an image coordinate space;
   establishing a nominal relationship between the image coordinate space and a ground coordinate space;
   fitting a nominal parametric equation having at least one coefficient to the established nominal relationship such that the nominal parametric equation describes the established nominal relationship between the image coordinate space and the ground coordinate space;
   developing an adjustment model by combining the fitted nominal equation with a parametric adjustment equation having at least one adjustable coefficient;
   measuring GCP ground coordinates and the GCP image coordinates of at least one ground control point (GCP);
   forming observation equations using the measured GCP ground coordinates and GCP image coordinates; and
   solving for the at least one adjustable coefficient of the developed adjustment model using the formed observation equations and the developed adjustment model.

2. The method of claim 1, further comprising the steps of:
obtaining at least one other image, the image and the at least one other image having at least one overlapping portion such that at least one tie point (TP) exists in the at least one overlapping portion; and
measuring the TP image coordinates of the at least one tie point in the overlapping portion,
wherein the forming observation equations uses the measured TP image coordinates.

3. The method of claim 1, wherein the obtaining step includes automatically obtaining any images.

4. The method of claim 1, wherein the establishing the nominal relationship step uses a physical camera model.

5. The method of claim 4, wherein the establishing the nominal relationship step includes using exterior and interior orientation parameters of an imaging device.

6. The method of claim 1, wherein the fitting the nominal parametric equation step uses a rational polynomial.

7. The method of claim 1, wherein the fitting the nominal parametric equation step uses a polynomial.

8. The method of claim 1, wherein the fitting the nominal parametric equation step uses an orthogonal polynomial.

9. The method of claim 1, wherein a range of the adjustment model is in the image coordinate space.

10. The method of claim 1, wherein a range of the adjustment model is in the ground coordinate space.

11. The method of claim 1, wherein a domain of the adjustment model is in the image coordinate space.

12. The method of claim 1, wherein a domain of the adjustment model is in the ground coordinate space.

13. The method of claim 1, wherein the adjustment model is an offset.

14. The method of claim 1, wherein the adjustment model is an affine transformation.

15. The method of claim 1, wherein the adjustment model is a polynomial model.

16. The method of claim 1, wherein the adjustment model is a Fourier series.

17. The method of claim 1, wherein the adjustment model is a wavelet model.

18. The method of claim 1, wherein the solving step includes using least squares.

19. The method of claim 1, wherein the solving step includes using a robust estimation.

20. The method of claim 18, wherein the least squares is a non-linear least squares.

21. The method of claim 1, wherein the solving step is iterated until convergence is achieved.

22. A method performed on a processor of adjusting a plurality of images to provide a relationship between a ground coordinate space and an image coordinate space, the method comprising the steps of:
obtaining a plurality of images, each image having an image coordinate space, wherein the images form at least one overlapping portion such that at least one tie point (TP) exists in the at least one overlapping portion;
establishing a nominal relationship between the image coordinate space and a ground coordinate space;
fitting a nominal parametric equation having at least one coefficient to the established nominal relationship such that the nominal parametric equation describes the established nominal relationship between the image coordinate space and the ground coordinate space;
developing an adjustment model by combining the fitted nominal equation with a parametric adjustment equation having at least one adjustable coefficient;
measuring TP image coordinates of the at least one tie point;
forming observation equations using the measured TP image coordinates; and
solving for the at least one adjustable coefficient of the developed adjustment model using the observation equations and the developed adjustment model.

23. The method of claim 22, further comprising the step of:
measuring GCP ground coordinates of at least one ground control point,
wherein the forming observation equations uses the measured GCP ground coordinates.

24. The method of claim 22, wherein the obtaining step includes automatically obtaining the plurality of images.

25. The method of claim 22, wherein the establishing the nominal relationship step uses a physical camera model.

26. The method of claim 25, wherein the establishing the nominal relationship step includes using exterior and interior orientation parameters of an imaging device.

27. The method of claim 22, wherein the fitting the nominal parametric equation step uses a rational polynomial.

28. The method of claim 22, wherein the fitting the nominal parametric equation step uses a polynomial.

29. The method of claim 22, wherein the fitting the nominal parametric equation step uses an orthogonal polynomial.

30. The method of claim 22, wherein a range of the adjustment model is in the image coordinate space.

31. The method of claim 22, wherein a range of the adjustment model is in the ground coordinate space.

32. The method of claim 22, wherein a domain of the adjustment model is in the image coordinate space.

33. The method of claim 22, wherein a domain of the adjustment model is in the ground coordinate space.

34. The method of claim 22, wherein the adjustment model is an offset.

35. The method of claim 22, wherein the adjustment model is an affine transformation.

36. The method of claim 22, wherein the adjustment model is a polynomial model.

37. The method of claim 22, wherein the adjustment model is a Fourier series.

38. The method of claim 22, wherein the adjustment model is a wavelet model.

39. The method of claim 22, wherein the solving step includes using least squares.

40. The method of claim 22, wherein the solving step includes using a robust estimation.

41. The method of claim 39, wherein the least squares is a non-linear least squares.

42. The method of claim 22, wherein the solving step is iterated until convergence is achieved.

43. A computer program product comprising:
a computer usable medium including computer readable code embodied therein for processing data to provide a relationship between an image coordinate space and a ground coordinate space, the computer usable medium comprising:
an image acquiring module configured to acquire at least an image having an image coordinate space;
a relational module configured to establish a nominal relationship between the image coordinate space and a ground coordinate space;
a fitting module configured to fit a nominal parametric equation having at least one coefficient to the established nominal relationship such that the nominal parametric equation describes the established nominal relationship between the image coordinate space and the ground coordinate space;

a development module configured to develop an adjustment model by combining the fitted nominal equation with a parametric adjustment model having at least one adjustable coefficient;

a receiving module configured to receive GCP ground coordinates and GCP image coordinates of at least one ground control point (GCP);

an observation module configured to form observation equations using the received GCP ground coordinates and GCP image coordinates; and a calculating module configured to solve for the at least one adjustable coefficient of the developed adjustment model using the formed observation equations and the developed adjustment model.

44. The computer program product of claim 43, wherein the acquiring module is further configured to acquire at least one other image, the image and the at least one other image having at least one overlapping portion where at least one tie point (TP) exists in the at least one overlapping portion; and the receiving module is further configured to receive the TP image coordinates of the at least one tie point, wherein the observation module is further configured to form observation equations using the received TP image coordinates.

45. The computer program product of claim 43, wherein acquiring module is configured to automatically acquire any images.

46. The computer program product of claim 43, wherein the relational module is configured to establish the nominal relationship using a physical camera model.

47. The computer program product of claim 46, wherein the relational module is configured to establish the nominal relationship using exterior and interior orientation parameters of an imaging device.

48. The computer program product of claim 43, wherein the fitting module is configured to fit a rational polynomial.

49. The computer program product of claim 43, wherein the fitting module is configured to fit a polynomial.

50. The computer program product of claim 43, wherein the fitting module is configured to fit an orthogonal polynomial.

51. The computer program product of claim 43, wherein the development module is configured to develop an adjustment model using a range in the image coordinate space.

52. The computer program product of claim 43, wherein the development module is configured to develop an adjustment model using a range in the ground coordinate space.

53. The computer program product of claim 43, wherein the development module is configured to develop an adjustment model using a domain in the image coordinate space.

54. The computer program product of claim 43, wherein the development module is configured to develop an adjustment model using a domain in the ground coordinate space.

55. The computer program product of claim 43, wherein the development module is configured to develop an adjustment module as an offset.

56. The computer program product of claim 43, wherein the development module is configured to develop an adjustment module as an affine transformation.

57. The computer program product of claim 43, wherein the development module is configured to develop an adjustment module as a polynomial model.

58. The computer program product of claim 43, wherein the development module is configured to develop an adjustment module as a Fourier series.

59. The computer program product of claim 43, wherein the development module is configured to develop an adjustment module as a wavelet model.

60. The computer program product of claim 43, wherein the calculating module is further configured to solve for the at least one adjustable coefficient using least squares.

61. The computer program product of claim 43, wherein the calculating module is further configured to solve for the at least one adjustable coefficient using a robust estimation.

62. The computer program product of claim 60, wherein the calculating module is further configured to solve for the at least one adjustable coefficient using non-linear least squares.

63. The computer program product of claim 43, wherein the calculating module is further configured to iterate the calculating step until convergence is achieved.

64. A computer program product comprising:

a computer usable medium including computer readable code embodied therein for processing data to provide a relationship between an image coordinate space and a ground coordinate space, the compute usable medium comprising:

an image acquiring module configured to acquire a plurality of images, each image having an image coordinate space, wherein the images form at least one overlapping portion such that at least one tie point (TP) exists in the at least one overlapping;

a relational module configured to establish a nominal relationship between the image coordinate space and a ground coordinate space;

a fitting module configured to fit a nominal parametric equation having at least one coefficient to the established nominal relationship such that the nominal parametric equation describes the established nominal relationship between the image coordinate space and the ground coordinate space;

a development module configured to develop an adjustment model by combining the fitted nominal equation with a parametric adjustment model having at least one adjustable coefficient;

a receiving module configured to receive TP image coordinates of the at least one tie point;

an observation module configured to form observation equations using the received TP image coordinates; and a calculating module configured to solve for the at least one adjustable coefficient of the developed adjustment model using the formed tie point observation equations and the developed adjustment model.

65. The computer program product of claim 64, wherein the receiving module is further configured to receive GCP ground coordinates of at least one ground control point; and the observation module is further configured to form observation equations using the received GCP ground coordinates.

66. The computer program product of claim 64, wherein the image acquiring module is configured to automatically acquire the plurality of images.

67. The computer program product of claim 64, wherein the relational module is configured to establish the nominal relationship using a physical camera model.

68. The computer program product of claim 67, wherein the relational module is configured to establish the nominal relationship using exterior and interior orientation parameters of an imaging device.

69. The computer program product of claim 64, wherein the fitting module is configured to fit a rational polynomial.

70. The computer program product of claim 64, wherein the fitting module is configured to fit a polynomial.

71. The computer program product of claim 64, wherein the fitting module is configured to fit an orthogonal polynomial.

72. The computer program product of claim 64, wherein the development module is configured to develop an adjustment model using a range in the image coordinate space.

73. The computer program product of claim 64, wherein the development module is configured to develop an adjustment model using a range in the ground coordinate space.

74. The computer program product of claim 64, wherein the development module is configured to develop an adjustment model using a domain in the image coordinate space.

75. The computer program product of claim 64, wherein the development module is configured to develop an adjustment model using a domain in the ground coordinate space.

76. The computer program product of claim 64, wherein the development module is configured to develop an adjustment module as an offset.

77. The computer program product of claim 64, wherein the development module is configured to develop an adjustment module as an affine transformation.

78. The computer program product of claim 64, wherein the development module is configured to develop an adjustment module as a polynomial model.

79. The computer program product of claim 64, wherein the development module is configured to develop an adjustment module as a Fourier series.

80. The computer program product of claim 64, wherein the development module is configured to develop an adjustment module as a wavelet model.

81. The computer program product of claim 64, wherein the calculating module is further configured to solve for the at least one adjustable coefficient using least squares.

82. The computer program product of claim 64, wherein the calculating module is further configured to solve for the at least one adjustable coefficient using a robust estimation.

83. The computer program product of claim 81, wherein the calculating module is further configured to solve for the at least one adjustable coefficient using non-linear least squares.

84. The computer program product of claim 64, wherein the calculating module is further configured to iterate the calculating step until convergence is achieved.

* * * * *